(12) United States Patent
Swaminathan et al.

(10) Patent No.: US 10,887,640 B2
(45) Date of Patent: Jan. 5, 2021

(54) UTILIZING ARTIFICIAL INTELLIGENCE TO GENERATE ENHANCED DIGITAL CONTENT AND IMPROVE DIGITAL CONTENT CAMPAIGN DESIGN

(71) Applicant: Adobe Inc., San Jose, CA (US)

(72) Inventors: Viswanathan Swaminathan, Saratoga, CA (US); Somdeb Sarkhel, Dallas, TX (US); Saayan Mitra, San Jose, CA (US)

(73) Assignee: ADOBE INC., San Jose, CA (US)

( * ) Notice: Subject to any disclaimer, the term of this patent is extended or adjusted under 35 U.S.C. 154(b) by 214 days.

(21) Appl. No.: 16/032,240

(22) Filed: Jul. 11, 2018

(65) Prior Publication Data

US 2020/0021873 A1 Jan. 16, 2020

(51) Int. Cl.
*H04N 21/466* (2011.01)
*H04N 21/262* (2011.01)
*H04N 21/8549* (2011.01)
*G06N 5/04* (2006.01)

(52) U.S. Cl.
CPC ....... *H04N 21/26241* (2013.01); *G06N 5/046* (2013.01); *H04N 21/466* (2013.01); *H04N 21/8549* (2013.01)

(58) Field of Classification Search
CPC .................................................. H04N 21/4666
See application file for complete search history.

(56) References Cited

U.S. PATENT DOCUMENTS

2016/0140146 A1\* 5/2016 Wexler ................. G06K 9/4604
707/741
2017/0109584 A1\* 4/2017 Yao .................... H04N 21/4666

\* cited by examiner

*Primary Examiner* — Michael H Hong
(74) *Attorney, Agent, or Firm* — Keller Jolley Preece

(57) ABSTRACT

The present disclosure relates to systems, methods, and non-transitory computer readable media for utilizing an artificial intelligence framework for generating enhanced digital content and improving digital content campaign design. In particular, the disclosed systems can utilize a metadata neural network, a summarizer neural network, and/or a performance neural network to generate metadata for digital content, predict future performance metrics, generate enhanced digital content, and provide recommended content changes to improve performance upon dissemination to one or more client devices.

20 Claims, 14 Drawing Sheets

UTILIZING ARTIFICIAL INTELLIGENCE TO GENERATE ENHANCED DIGITAL CONTENT AND IMPROVE DIGITAL CONTENT CAMPAIGN DESIGN

BACKGROUND

Advancements in software and hardware platforms have led to a variety of improvements in systems for generating and providing digital content to client devices. For example, digital content distribution systems are now able to generate, monitor, and analyze digital content distributed to remote client devices as part of a digital content campaign. Digital content distribution systems can also determine historical performance of the digital content in relation to user interaction with receiving computing devices.

Despite these advances however, conventional digital content distribution systems continue to suffer from a number of disadvantages, particularly in the accuracy, efficiency, and flexibility of generating and evaluating digital content for a digital content campaign. For example, although many conventional digital content distribution systems provide digital content to client devices, the digital content is often misaligned to users of client devices and/or distribution channels. For example, conventional content distribution systems often provide inaccurate digital content that is not precisely tailored to particular audiences or distributions channels, resulting in digital content that client devices do not review, open, or utilize. This inaccuracy can result in client devices and associated users abandoning a website, service, or product associated with the digital content.

In addition, conventional digital content distribution systems are also inefficient. Indeed, as just discussed, conventional systems often waste significant computing resources in providing unnecessary, inaccurate, and excessive digital content to satisfy digital content campaign objectives. In addition to this unnecessary waste, conventional systems also require significant time and computing resources to generate and provide targeted digital content for a digital content campaign. For example, some digital content distribution systems use publishers and a variety of distributed computer devices to generate digital content and apply tags or labels to the digital content. The digital content distribution system then provides the digital content to client devices and utilize backward looking metrics to estimate future performance for the digital content. Digital content distribution systems can further utilize publishers and various publisher devices to modify the digital content based on its past performance. This approach requires significant time, processing power, and storage resources for implementing computing systems (and operating individuals).

Moreover, some conventional digital content distribution systems are inflexible. For example, many conventional systems cannot operate accurately without tags or labels already affixed to digital content. Moreover, conventional digital content distribution systems cannot flexibly generate digital content and predict performance prior to running a digital content campaign with the digital content item in relation to different characteristics or distribution channels.

Thus, there are several disadvantages with regard to conventional digital content distribution systems.

SUMMARY

One or more embodiments described herein provide benefits and solve one or more of the foregoing or other problems in the art with systems, methods, and non-transitory computer readable media that utilize an artificial intelligence framework to accurately and flexibly generate enhanced digital content and improve digital content distribution campaign design. In particular, the disclosed systems can utilize a metadata neural network, a summarizer neural network, and/or a performance neural network to generate valuable insights in planning a digital content campaign, such as automatically generating metadata corresponding to digital content, predicting digital content performance for various client devices and/or distribution parameters, providing suggestions for altering digital content or distribution parameters, and generating enhanced digital content that improves performance in relation to receiving client devices. Accordingly, the disclosed systems can utilize a neural network framework to aide in accurately, efficiently, and flexibly generating and planning a digital content campaign and/or distributing digital content to client devices.

For example, the disclosed systems can utilize a neural network to generate deep features for a digital video (or other digital content). Based on the deep features of the digital video, the disclosed systems can utilize a metadata neural network to generate metadata associated with the digital video (e.g., keywords that relate to content of the digital video). The disclosed systems can also identify one or more distribution parameters for a digital content campaign such as a distribution channel, characteristics of a target audience, and/or a time of day for distribution of digital content. Based on the distribution parameters and the features of the digital video, the disclosed systems can generate a performance metric reflecting effectiveness of the digital video with respect to the distribution parameters (e.g., a prediction of effectiveness of the digital video upon distribution via the particular distribution channel). Moreover, the disclosed systems can utilize a summarizer neural network to generate a digital video summary based on the features of the digital video and further based on the performance metric. Specifically, the disclosed systems can generate the digital video summary that improves the performance metric by, for example, generating a video trailer of a shorter duration that is more effective when distributed via a particular distribution channel. Similarly, the disclosed systems can provide a variety of recommended modifications to the digital video summary to further improve the performance metric.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
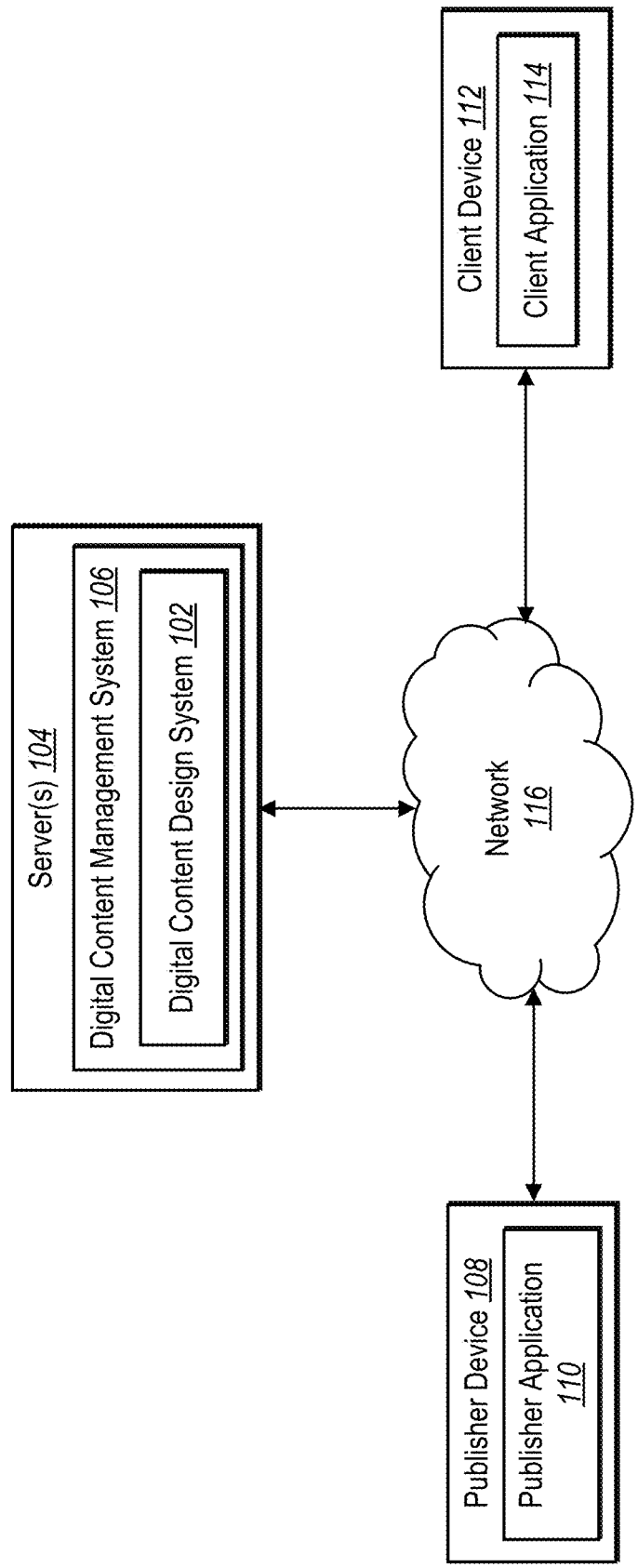
FIG. 1 illustrates an example environment for implementing a digital content design system in accordance with one or more embodiments.

One or more embodiments described herein provide benefits and solve one or more of the foregoing or other problems in the art with a digital content design system that utilizes artificial intelligence and machine learning to accurately and flexibly generate enhanced digital content and improve distribution performance. In particular, the digital content design system can utilize a neural network framework that includes a metadata neural network, a summarizer neural network, and/or a performance neural network to assist in planning video digital content distribution campaigns. For example, the digital content design system can utilize an artificial intelligence framework that acts on an uploaded video to generate actionable insights such as predictions, recommended changes, and metadata. The digital content design system can also combine in-context (e.g., in-video) intelligence based on video, audio, textual, or other features, along with historical performance of training videos to predict channel-specific key performance indicators. Accordingly, the digital content design system can utilize a neural network framework to accurately, efficiently, and flexibly generate digital content that improves performance upon distribution to client devices.

For example, the digital content design system can apply a neural network to a digital video to generate deep features for the digital video. Based on the deep features, the digital content design system can utilize a metadata neural network to generate metadata (e.g., keywords) associated with the digital video. The digital content design system can also identify distribution parameters for a digital content campaign and, based on the distribution parameters and the deep features, generate a performance metric reflecting effectiveness of the digital video with respect to the distribution parameters. Moreover, the digital content design system can utilize a summarizer neural network to generate a digital video summary based on the deep features of the digital video and the performance metric. The digital content design system can also provide various recommended modifications to improve the performance metric.

As mentioned, the digital content design system can utilize a metadata neural network to generate metadata for a digital video. In particular, the digital content design system can generate metadata, such as keywords that describe content of the digital video. For example, to generate the metadata, the digital content design system can apply a metadata neural network that analyzes visual features, audio features, combined audio-visual features, and/or other features from the digital video to generate descriptive metadata. For instance, the digital content design system can utilize pooling layers to generate a visual feature vector and an audio feature vector and utilize a fully connected layer to analyze the visual feature vectors and the audio feature vectors to predict keyword classifications for the digital video.

As also mentioned, the digital content design system can utilize a summarizer neural network to generate a digital video summary for the digital video. In particular, the digital content design system can utilize a summarizer neural network that includes an aesthetics neural network, a relevancy neural network, and a generative reconstructor neural network. More specifically, the digital content design system can utilize an aesthetics neural network and a relevancy neural network to select representative and visually appealing frames the digital video. Based on the representative frames, the digital content design system can utilize a generative reconstructor neural network to generate a reconstructed digital video. By comparing the reconstructed digital video and the original digital video, the digital content design system can generate digital video summaries of variable lengths and types, such as thumbnails, storyboards, animated thumbnails, or video trailers.

The digital content design system can further utilize a performance neural network to determine a performance metric for a digital video. To illustrate, as part of the performance neural network, the digital content design system can utilize a visual prediction neural network to generate predicted visual performance metrics. In addition, the digital content design system can utilize a text prediction neural network to generate textual performance metrics (e.g., based on the generated metadata for the digital video). Furthermore, the digital content design system can apply a multi-modal combination model to generate a composite performance metric based on the visual performance metrics and the textual performance metrics.

The digital content design system can predict performance metrics with respect to particular distribution channels or features of users/client devices. For example, the digital content design system can train the performance neural network based on historical performance data, training distribution channels, training client device characteristics, and/or training user characteristics. The performance neural network can then generate predictions for digital videos that are specific to particular distribution parameters selected by an administrator or publisher.

The digital content design system can apply the metadata neural network, the summarizer neural network, and/or the performance neural network in any order or arrangement to generate valuable insights to publishers via a publisher device. For example, the digital content design system can generate a digital video summary (utilizing the summary neural network), determine a performance metric (utilizing the performance neural network), and compare the generated performance metric against a threshold. Based on determining that the performance metric fails to satisfy the threshold, the digital content design system can further utilize the summarizer neural network to generate an enhanced digital video (e.g., a new digital video summary) to improve the performance metric. In some embodiments, the digital content design system can generate insight to improve a performance metric without necessarily comparing the performance metric against a threshold. Indeed, the digital content design system can provide insight to improve the performance metric even in cases where the performance metric already satisfies a particular threshold.

In some embodiments, the digital content design system can also generate recommended modifications for the digital video to improve the performance metric. For example, the digital content design system can generate recommended modifications such as a recommended duration for a digital video summary, a recommended distribution channel, a recommended time of day for distribution, or a recommended target audience. The digital content design system can also generate recommendations for color palette, audio range, or other features. In this manner, the digital content design system can generate and implement modifications for a digital video (and/or distribution parameters for the digital video).

The digital content design system provides several advantages over conventional systems. For example, the digital content design system can improve accuracy in designing digital content campaigns. For instance, as discussed above, the digital content design system can generate precise metadata and accurate performance metrics for digital content proposed for a digital content campaign. Furthermore, the digital content design system can generate enhanced digital content based on the metadata and predicted performance metrics. Accordingly, the digital content design system can generate valuable insights and enhanced digital content that is accurately aligned to particular distribution channels and/or audiences, even before distributing the digital content as part of a digital content campaign.

The digital content design system further improves efficiency and stability over conventional systems. To illustrate, the digital content design system utilizes fewer computer resources and less processing power to satisfy digital content campaign objectives by more accurately aligning digital content with client devices and proposed distribution parameters (thus reducing unnecessary waste). In addition, the digital content design system avoids the time and computational resources associated with utilizing distributed publisher computing devices to generate digital content, monitor performance of the digital content, create new digital content based on the monitored performance, etc. Indeed, the digital content design system can avoid these creative round trips and computational costs by determining performance metrics (prior to distribution of the digital content) and automatically generating enhanced digital content.

The digital content design system also improves flexibility over conventional systems. For example, as discussed above, the digital content design system can automatically generate metadata, and thus, can accurately analyze and enhance any type of digital content (even digital content that does not include labels or tags). Moreover, the digital content design system can predict performance metrics and modify digital content, even before distributing the digital content to client devices as part of a digital content campaign. In addition, the digital content design system can flexibly consider a wide array of characteristics in generating digital content and insights. For example, the digital content design system can consider video features, audio features, bidding performance, context logs, distribution parameters, historical performance, and user characteristics in generating metadata, digital content summaries, distribution parameter recommendations, digital content recommendations, and/or predicted performance metrics.

Moreover, although many embodiments described herein focus on digital videos, the digital content design system can perform the techniques and methods described herein with respect to a variety of different types of digital content (including digital video, digital audio, digital images, and/or digital text). Furthermore, the digital content design system can utilize additional (or alternative) artificial intelligence frameworks than the metadata neural network, the summarizer neural network, and the performance neural network. Indeed, because of its flexible architecture, the digital content design system can be implemented together with a variety of artificial intelligence frameworks to achieve a variety of different functions.

As illustrated by the foregoing discussion, the present disclosure utilizes a variety of terms to describe features and benefits of the digital content design system. Additional detail is hereafter provided regarding the meaning of these terms as used in this disclosure. For example, the term "digital content" refers to any form of digital media. For example, digital content can refer to digital video, digital images, digital audio, digital text, or other varieties digital media. In addition, the term "digital content campaign" refers to rules, parameters, and/or digital content items for utilization in distributing digital content to client devices. For example, a digital content campaign can refer to digital content (e.g. digital videos and/or digital images) and corresponding distribution parameters (e.g., target audiences, target distribution channels, budget, or bidding parameters) for providing the digital content to client devices (e.g., portable devices, personal computers, or televisions). A digital content campaign can refer to a campaign that takes place over a social network, one or more websites, and/or as part of other streamed digital content (e.g., a digital video). To illustrate, a digital content campaign can include an advertising campaign for distributing digital content for promotions via the Internet to one or more users of client devices.

As used herein, the term "digital video summary" refers to a subset of frames of a digital video. A digital video summary can refer to a digital video of a modified duration or a modified number of frames. In particular, a digital video summary includes one or more frames of a digital video that are representative of the content of the digital video. For example, a digital video summary can include a thumbnail, a storyboard, an animated thumbnail, or a video trailer.

As mentioned, the digital content design system can utilize neural networks to generate various digital insights, such as digital video summaries for a digital video, metadata associated with a digital video, and a performance metric associated with a digital video or digital video summary. As used herein, the term "neural network" (or "artificial neural network") refers to an artificial machine-learning model that learns tasks by analyzing example data utilizing a plurality of layers that analyze features of the example data at different levels of abstraction. In particular, the term "neural network" can include a model of interconnected digital neurons that communicate and learn to approximate complex functions and generate outputs based on a plurality of inputs provided to the model. A neural network can include a variety of deep learning models, including convolutional neural networks, recurrent neural networks (e.g., with long short-term memory architecture), deep belief networks, or deep stacking networks. Neural networks such as convolutional neural networks can model complex non-linear relationships by generating compositional models that represent data as layered compositions of information. To illustrate, in one or more embodiments the digital content design system utilizes a convolutional neural network (e.g., a "featurizer neural network") trained to generate sequences of deep features for frames of a digital video.

As used herein, the term "deep feature" can refer to latent or hidden features (e.g., features of digital content) analyzed within a neural network. To illustrate, deep features can include one or more feature vectors generated by one or more layers of a neural network to reflect a digital image, frame, digital video, digital audio or other input data (e.g., performance data or distribution parameters). Deep features can include, for example, characteristics of a digital frame (and/or other data) at different levels of abstraction generated at various layers of a neural network. Deep features can contain non-linear characteristics that are uninterpretable to human viewers.

As mentioned, the digital content design system can identify a distribution parameter associated with a digital video. As used herein, the term "distribution parameter" refers to a characteristic or feature that relates to distributing digital content as part of a digital content campaign. In particular, a distribution parameter can refer to a distribution preference set by a publisher or can refer to a parameter that is determined automatically by the digital content design system for distributing digital content. For example, a distribution parameter can refer to a distribution channel, a time of day for distributing digital content, or characteristics of a target audience.

As used herein, a "distribution channel" can refer to an outlet, venue, platform or conduit for providing or disseminating digital content (e.g., as part of digital content campaign). A distribution channel can include a particular technology, interface, communications protocol, website, or medium suitable for distributing digital content. For example, a distribution channel can include one or more websites (e.g., online impression opportunities on a website), email, messaging (e.g., instant messaging or SMS), in-application notifications (e.g., banner within a mobile application), or social networks (e.g., an impression opportunity in a news feed on a social network) Additionally "characteristics of a target audience" (or "audience characteristics") can refer to various audience traits or demographics such as age, gender, occupation, nationality, geographic location, type of client device, applications running on a client device, operating systems, or purchase history.

As mentioned, the digital content design system can utilize a metadata neural network to generate metadata associated with a digital video. As used herein, the term "metadata" refers to information associated with (e.g., describing) digital content. For instance, metadata can include tags or labels describing content portrayed in a digital video. Similarly, metadata can include keywords reflecting content of a digital video, a digital image, a digital audio clip, or some other form of digital content.

In addition, the term "metadata neural network" refers to a neural network that the digital content design system utilizes to generate metadata for digital content. For example, a metadata neural network can include a feature layer whereby the metadata neural network can extract features such as visual features and audio features (or other types of features) from a digital video. The metadata neural network can further include learnable pooling layers for generating feature vectors corresponding to the extracted features—e.g., a visual feature vector and an audio feature vector. Further, the metadata neural network can include a fully connected layer for analyzing the feature vectors to generate metadata for a digital video.

As mentioned, the digital content design system can further utilize a summarizer neural network to generate a digital video summary. As used herein, the term "summarizer neural network" refers to a neural network that generates a digital summary for digital content. In particular, a summarizer neural network includes a neural network that generates digital video summaries (of different length and type) from a digital video. In relation to a digital video, a summarizer neural network can include an aesthetics neural network for generating aesthetics scores (to indicate clarity and/or visual appeal) associated with frames of the digital video. A summarizer neural network can further include a relevancy neural network for generating relevancy scores for the frames of the digital video to indicate a relatedness of a given frame to the digital video as a whole. Additionally, a summarizer neural network can include a generative reconstructor neural network to generate a reconstructed digital video based on the aesthetics scores and the relevancy scores.

The digital content design system can further utilize a performance neural network to generate or estimate a performance metric associated with digital content. As used herein the term "performance neural network" refers to a neural network that generates a performance metric for digital content (e.g., a digital video). A performance neural network can include a visual prediction model for generating predicted performance metrics based on video data. A performance neural network can also include a text prediction model for generating textual performance metrics based on generated metadata. Further, a performance neural network can include a multi-modal combination model to generate a composite performance metric based on the visual performance metrics and the textual performance metrics. In addition, the term "performance metric" refers to a metric or score that indicates an effectiveness or a prediction of performance associated with a digital video (or other digital content). For example, a performance metric can refer to a rating on a scale from 1 to 5 of how effective a digital video or digital video summary will be in generating conversions or other audience reactions (e.g., shares, likes, etc.). A performance metric can also include a distribution of scores on a scale where each score has a corresponding score strength or probability.

In one or more embodiments, the performance metric reflects a number or rate of conversions. As used herein, a "conversion" refers to a monitored act, event, or behavior of a user/client device. In particular, the term conversion includes an act, event, or behavior monitored (and desired) by a publisher (or administrator). For example, a conversion may include a purchase or a subscription (e.g., by signing up for a subscription to digital assets). In some embodiments, a performance metric may refer to other factors such as impressions or clicks. An "impression" can refer to a view, a page land, or an exposure to a particular item of digital content, and a "click" can refer to a user selection of a particular item of digital content.

As mentioned, in some embodiments the digital content design system trains one or more neural networks based on training data. As used herein, the term "train" refers to utilizing information to tune or teach a neural network. The term "training" (used as an adjective or descriptor, such as "training digital frames" or "training digital video") refers to information or data utilized to tune or teach the neural network.

Additional detail regarding the digital content design system will now be provided with reference to the figures. For example, FIG. 1 illustrates a schematic diagram of an example environment for implementing a digital content design system 102 in accordance with one or more embodiments. An overview of the digital content design system 102 is described in relation to FIG. 1. Thereafter, additional detail regarding components and processes of the digital content design system 102 is provided in relation to the subsequent figures.

As shown in FIG. 1, the environment includes server(s) 104, a publisher device 108, a client device 112, and a network 116. Each of the components of the environment can communicate via the network 116, and the network 116 may be any suitable network over which computing devices can communicate. Example networks are discussed in more detail below in relation to FIG. 14.

As shown in FIG. 1, the environment includes a publisher device 108. The publisher device 112 can be one of a variety of computing devices, including a smartphone, tablet, smart television, desktop computer, laptop computer, virtual reality device, augmented reality device, or other computing device as described in relation to FIG. 14. The publisher device 108 can be associated with a publisher, and the publisher device 108 can be capable of providing user input to set preferences associated with the digital content design system. For example, the digital content design system can receive one or more distribution parameters, modifications to distribution parameters, and/or modifications to digital content from the publisher device 108.

Similarly, the environment includes a client device 112. The client device 112 can be one of a variety of computing devices, including a smartphone, tablet, smart television, desktop computer, laptop computer, virtual reality device, augmented reality device, or other computing device as described in relation to FIG. 14. Although FIG. 1 illustrates a single client device 112, in some embodiments the environment can include multiple different user client devices, each associated with a different user.

As illustrated in FIG. 1, the environment includes the server(s) 104. The server(s) 104 may generate, store, receive, and transmit electronic data, such as digital video, digital images, digital audio, metadata, etc. For example, the server(s) 104 may receive data from the publisher device 108 in the form of a digital video. In addition, the server(s) 104 can transmit data to the client device 112 to provide the digital video or a digital video summary generated based on the received digital video. For example, the server(s) 104 can communicate with the client device 112 to transmit and/or receive data via the network 116. In some embodiments, the server(s) 104 comprises a content server. The server(s) 104 can also comprise an application server, a communication server, a web-hosting server, a social networking server, or a digital content campaign server.

As shown in FIG. 1, the server(s) 104 can also include the digital content design system 102 as part of a digital content management system 106. The digital content management system 106 can communicate with the client device 112 to provide digital content such as digital video, digital images, or some other type of information. Indeed, the digital content management system 106 can refer to a digital content campaign system (e.g., a system for selecting and providing customized digital videos to client devices simultaneously accessing websites or other digital assets), a digital media editing system, and/or a digital media viewing system. For example, the digital content design system 106 can generate an enhanced digital video for a particular audience via a particular distribution channel. The digital content management system 106 (and/or the digital content design system 102) can identify a client device corresponding to the audience and deliver the enhanced digital video via the distribution channel.

Although FIG. 1 depicts the digital content design system 102 located on the server(s) 104, in some embodiments, the digital content design system 102 may be implemented by (e.g., located entirely or in part) on one or more other components of the environment. For example, the digital content design system 102 may be implemented by the client device 112 and/or the publisher device 108.

Moreover, in one or more embodiments, the digital content design system 102 is implemented on a third-party server. For example, in such embodiments, the server(s) 104 may be associated with a digital content publisher, and a third-party server can host the digital content design system 102. Specifically, the third-party server can receive information regarding a user, provide identification information for the user from the third-party server to the digital content publisher by way of the server(s) 104, and the server(s) 104 can select and provide digital content for display to a client device (e.g., the client device 112) of a user.

As shown, the publisher device 108 includes a publisher application 110. The publisher application 110 may be a web application or a native application installed on the publisher device 108 (e.g., a mobile application, a desktop application, etc.). The publisher application 110 can interface with the digital content design system 102 to provide digital content such as digital video, digital content modifications, distribution parameters, and/or modified distribution parameters. The publisher application 110 can be configured to enable a publisher to set digital content campaign settings and to manage digital content for distribution to one or more users of an audience. Indeed, the publisher application 110 can present, for display, a user interface as part of a webpage, a social networking feed, or an application interface that includes various interactive (e.g., selectable) options for entering distribution parameters, uploading digital content, generating metadata, generating a digital summary, determining a performance metric, etc.

As illustrated in FIG. 1, the client device 112 includes a client application 114. The client application 114 may be a web application or a native application installed on the client device 112 (e.g., a mobile application, a desktop application, etc.). The client application 114 can interface with the digital content design system 102 to receive enhanced digital content such as digital video summaries from the server(s) 104, and to present (e.g., display) the digital content received from the server(s) 104. Indeed, the client application 114 can receive data from the digital content design system 102 and can present, for display, a user interface as part of a webpage, a social networking feed, or an application interface that includes a generated digital video summary.

In some embodiments, though not illustrated in FIG. 1, the environment may have a different arrangement of components and/or may have a different number or set of components altogether. For example, the publisher device 108 and/or the client device 112 may communicate directly with the digital content design system 102, bypassing the network 116. Additionally, the digital content design system 102 can include one or more databases (e.g., a digital content database) housed on the server(s) 104 or elsewhere in the environment. Further, the digital content design system 102 can include one or more machine learning models (e.g., neural networks), and the digital content design system 102 be implemented in a variety of different ways across the server(s) 104, the network 116, the publisher device 108, and the client device 112.

In addition, in some embodiments the digital content design system 102 can enable users and/or third-party systems to access and utilize insights generated by the digital content design system 102. For example, the digital content design system 102 can enable users to access and utilize various functions (e.g., components) of the digital content design system 102 as part of an application programming interface ("API") library. To illustrate, the digital content design system 102 can be included within an API library where other users or systems can call the various functions or components of the digital content design system 102— i.e., extracting features, generating metadata, generating digital content summaries, generating recommendations, and/or generating performance metrics. The digital content design system 102 can enable access to individual constituent functions/neural networks independently (or collectively). For example, the digital content design system 102 can enable a user to call an API to generate a digital content summary, to generate metadata for a particular digital content item, and/or to generate a performance metric for a particular digital content item.

Figure 2:
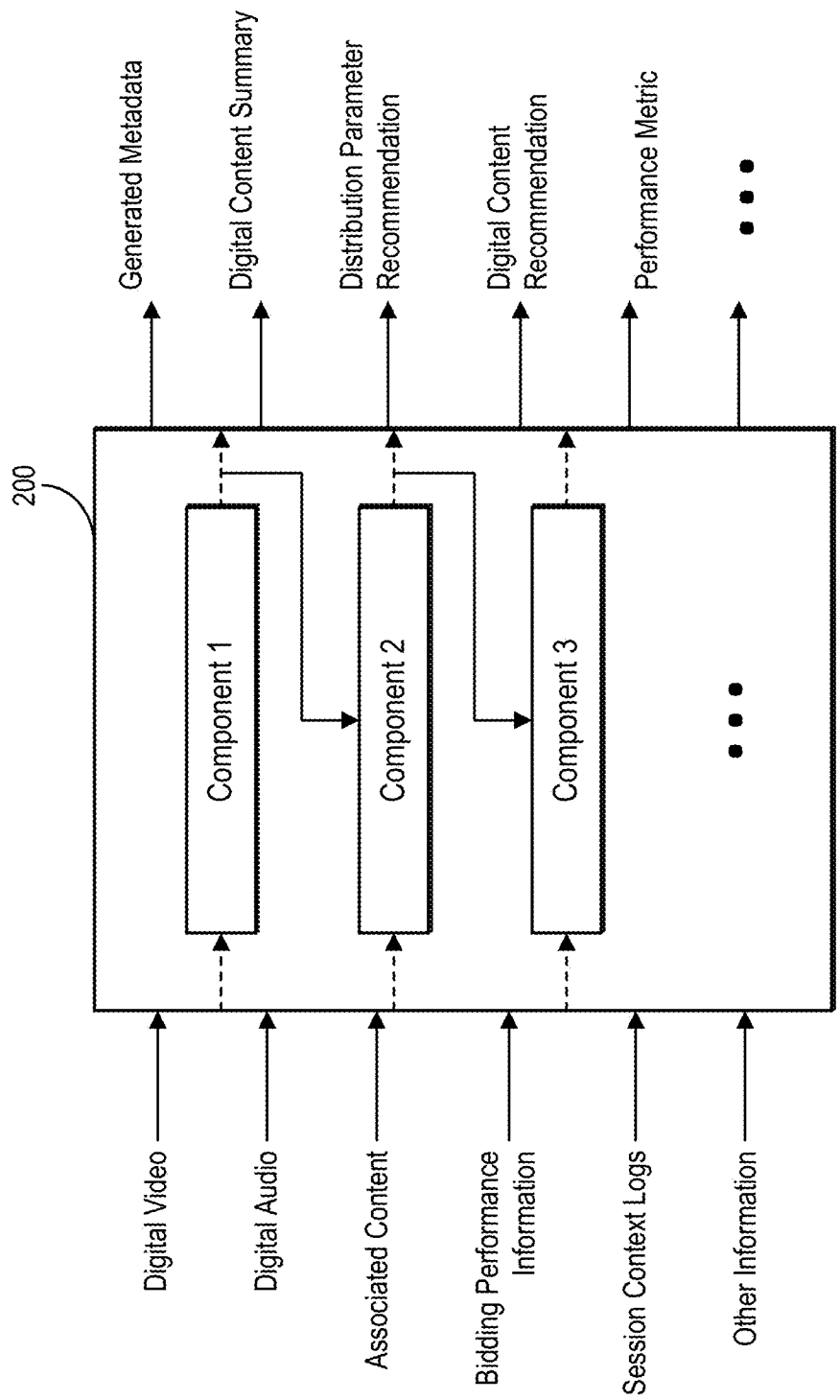
FIG. 2 illustrates inputs, outputs, and components utilized by the digital content design system in accordance with one or more embodiments.

As mentioned above, the digital content design system 102 can utilize a variety of inputs to generate different insights for a digital content campaign. For example, FIG. 2 illustrates an exemplary architecture 200 of the digital content design system 102. As shown, the digital content design system 102 can receive digital content in the form of digital video or digital audio. The digital content design system 102 can further receive content associated with digital video, digital audio. Such content can include metadata such as object tags, time stamps, geographic location information, or other metadata generated by a publisher, user, or device associated with the digital content.

As shown, the digital content design system 102 can also receive input in the form of bidding performance information. In particular, the digital content design system 102 can receive bidding performance information associated with prior or current digital content campaigns and other digital content (or the digital content). The bidding performance information can include a number of bids, a total value of bids, an average value of bids, or some other bidding metric for digital content.

As further shown in FIG. 2, the digital content design system 102 can receive input in the form of session context logs. To illustrate, the digital content design system 102 can receive session context logs that include information associated with user characteristics and behavior (e.g., user ID, user information, clicks, purchases, viewing activity, and other trackable or extrapolated context information for a user's online session).

Although not illustrated in FIG. 2, the digital content design system 102 can receive other information associated with digital content. As an example, the digital content design system 102 can receive various forms of performance information. To illustrate, the digital content design system 102 can receive information pertaining to a number of conversions, revenue, clicks, views, or other metrics associated with digital content. Indeed, the digital content design system 102 can collect historical conversion performance information from previous digital content campaigns.

Additionally, the digital content design system 102 can receive input in the form of a distribution parameter. As described above, a distribution parameter can include a duration of a digital video, a distribution channel, or characteristics of a target audience. For example, the digital content design system 102 can receive demographic information or other characteristics (as described above) of a particular audience.

As illustrated in FIG. 2, the digital content design system 102 can consider the various inputs to generate outputs via the architecture 200. Indeed, as described in further detail below, the digital content design system 102 can utilize Component 1, Component 2, and Component 3 (and others in some embodiments) to generate relevant metadata, enhanced digital content (such as a digital content summary), distribution parameter recommendations, a digital content recommendation, and/or a performance metric.

For example, the digital content design system 102 can utilize a metadata neural network to generate metadata for a digital video. As described in further detail below, the digital content design system 102 can utilize a metadata neural network whose architecture includes layers for extracting visual features from a digital video and for extracting audio features from the digital video. Based on the visual features and the audio features, the digital content design system 102 can utilize pooling layers to generate feature vectors from the extracted features. Additionally, based on the feature vectors, the digital content design system 102 can utilize a fully connected layer of the metadata neural network to analyze the feature vectors and generate metadata for the digital video. For example, the digital content design system 102 can generate a set of keywords and corresponding probabilities that indicate a level of similarity or correspondence between the keywords and the digital video.

As mentioned, and as shown in FIG. 2, the digital content design system 102 can generate a digital content summary based on input digital content. In particular, the digital content design system 102 can generate a digital video summary based on an input digital video. More specifically, the digital content design system 102 can utilize a summarizer neural network to generate a digital video summary from a digital video. The digital content design system 102 can utilize a summarizer neural network with an architecture that includes an aesthetics neural network for generating aesthetics scores for frames of a digital video, a relevancy neural network for generating relevancy scores for frames of the digital video, and a generative reconstructor neural network for generating a reconstructed digital video based on the aesthetics scores and the relevancy scores. The digital content design system 102 can further generate a digital video summary by selecting a subset of frames of the digital video based on comparing the reconstructed digital video with the original digital video.

As shown, the digital content design system 102 can further generate a performance metric. Indeed, the digital content design system 102 can utilize a performance neural network to generate a performance metric that represents a prediction of how a particular digital content item (e.g., a digital video or a digital video summary) will perform as part of a digital content campaign. To generate the performance metric, the digital content design system 102 can utilize a performance neural network with an architecture that includes a visual prediction model for generating predicted visual performance metrics for video data, a text prediction model for generating textual performance metrics for metadata associated with a digital video, and a multimodal combination model for generating a composite performance metric based on the visual performance metric and the textual performance metric.

Additionally, and as illustrated in FIG. 2, the digital content design system 102 can generate a distribution parameter recommendation. In particular, the digital content design system 102 can generate a recommended modification (or a recommended distribution parameter) for a distribution parameter based on the generated performance metric. As an example, the digital content design system 102 can generate a recommended distribution channel to improve the performance metric. For instance, if a given digital video summary is particularly well-suited for INSTAGRAM (e.g., has an appropriate duration), the digital content design system 102 can generate a recommendation to change a distribution channel from FACEBOOK to INSTAGRAM.

Similarly, as shown in FIG. 2, the digital content design system 102 can generate a digital content recommendation. In particular, the digital content design system 102 can generate a recommended modification for the digital content to improve the performance metric. To illustrate, the digital content design system 102 can generate a recommendation to modify the duration of a digital video summary to improve the performance metric for a particular target audience and/or distribution channel. Indeed, a video that has too long a duration may be less effective when distributed via INSTAGRAM than a digital video that has a shorter duration.

In some embodiments, the digital content design system 102 generates enhanced or modified digital content without generating recommendations. For example, based on determining a modification to a distribution parameter or to a digital video that would improve the performance metric, the digital content design system 102 can generate enhanced digital content in accordance with the determination. Indeed, if the digital content design system 102 determines that a shorter digital video summary would improve the performance metric, then the digital content design system 102 can generate a digital video summary with a shorter duration.

Figure 3:
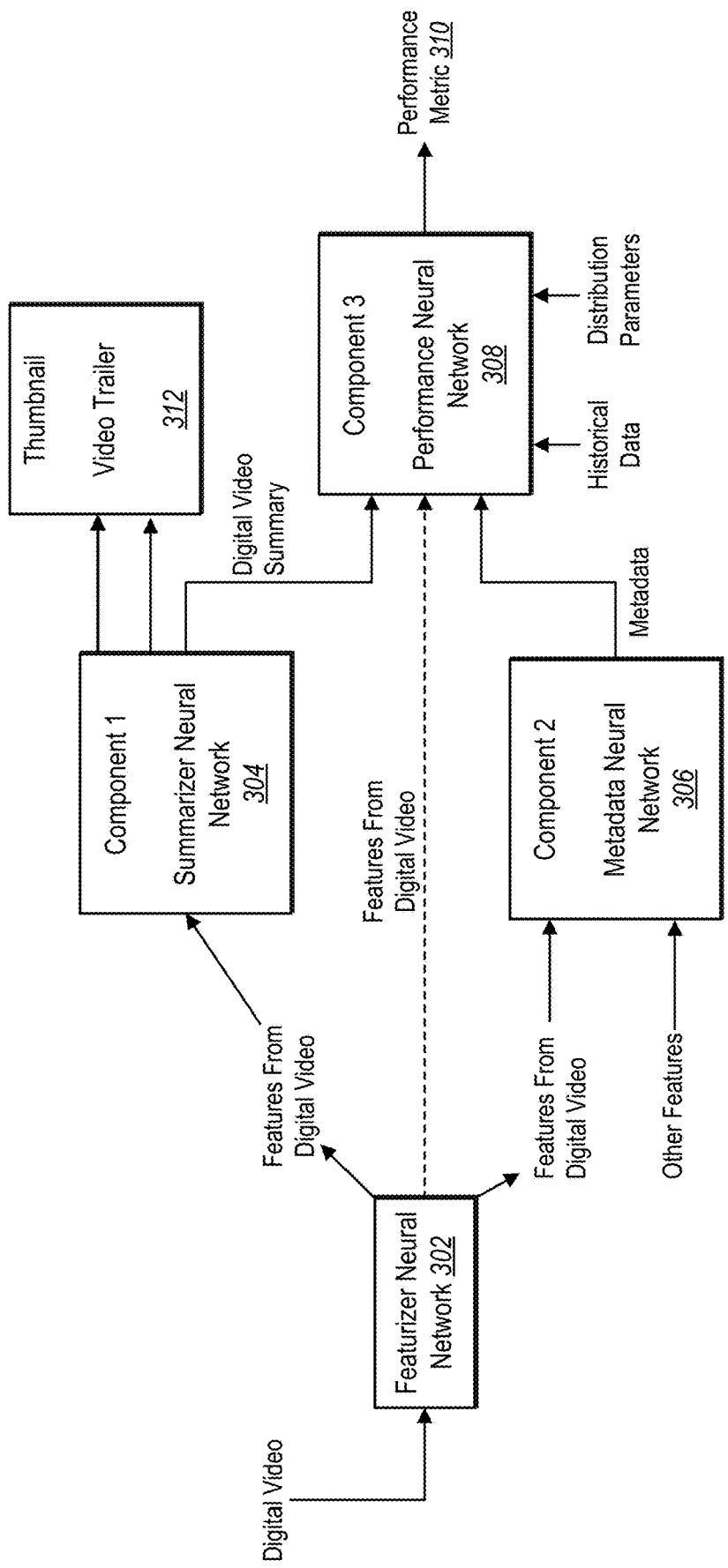
FIG. 3 illustrates inputs, features, and components a of the digital content design system in accordance with one or more embodiments.

As mentioned, the digital content design system 102 utilizes various components in generating outputs such as digital content summaries, metadata, and performance metrics. FIG. 3 illustrates additional detail regarding these components in accordance with one or more embodiments. In particular, FIG. 3 shows a featurizer neural network 302, a summarizer neural network 304, a metadata neural network 306, and a performance neural network 308 operating in conjunction to generate a performance metric 310 and enhanced digital content 312.

Specifically, as shown in FIG. 3, the digital content design system 102 utilizes a featurizer neural network 302 to generate or extract features associated with the digital video. For example, the digital content design system 102 can generate video features and audio features by utilizing a trained featurizer neural network 302 in the form of a deep convolutional neural network (or a neural network of a different architecture). Indeed, the digital content design system 102 can utilize a featurizer neural network 302 in the form of a classifier neural network (e.g., a convolutional neural network). To illustrate, the digital content design system 102 can access a neural network trained to classify digital content (e.g., classify objects portrayed in digital video or digital images, and/or classify sounds in digital audio). The digital content design system 102 can then utilize deep features generated by the classifier neural network as deep features for utilization in other components. For instance, the digital content design system 102 can utilize features extracted by a global pooling layer of an InceptionV3 network. In some embodiments, the digital content design system 102 can further receive (from a publisher device) or generate metadata features, or other types of features associated with the digital video.

As illustrated in FIG. 3, the digital content design system 102 further utilizes a summarizer neural network 304 to generate a digital video summary based on the video features of the input digital video. In particular, based on features of individual frames of the digital video, the digital content design system 102 can generate a digital video summary in the form of a thumbnail, a storyboard, an animated thumbnail, or a video trailer. As used herein, the term "thumbnail" refers to a digital video summary in the form of a single frame of a digital video. In particular, a thumbnail can include a single static image representation of a digital video. As also used herein, the term "storyboard" refers to a digital video summary in the form a plurality of still frames of a digital video. In particular, a storyboard can include individual (isolated) key frames of a digital video (e.g., still frame shots from different portions of a digital video). For example, a storyboard can refer to a subset of frames of a digital video displayed simultaneously (e.g., side-by-side) or else in a scrollable or click-through format.

As further used herein, the term "animated thumbnail" refers to a digital video summary in the form of a continuous (short) video clip. In particular, an animated thumbnail can include an animated series of frames selected within a selected segment of a digital video. To illustrate, an animated thumbnail can be playable to present an animated view of a number of frames of a digital video (e.g., a segment of a total duration of 2-3 seconds). In addition, the term "video trailer" refers to an animated series of frames selected from a digital video. In particular, a video trailer can refer to a plurality of segments of a digital video. For example, the digital content design system 102 can segment a digital video and can select a subset of segments to generate a video trailer that summarizes the digital video when viewed in sequence.

To elaborate on how the digital content design system 102 generates the digital video summary, the digital content design system 102 utilizes an aesthetics neural network as part of the summarizer neural network 304 to generate aesthetics score for frames of the digital video. Indeed, the digital content design system 102 can utilize the aesthetics neural network to generate aesthetics scores based on the video features of the input digital video. As used herein, the term "aesthetics neural network" refers to a neural network that generates aesthetics scores. In particular, an aesthetics neural network can refer to a convolutional neural network that rates or scores digital images (e.g., frames of a digital video) based on clarity, focus, and/or visual appeal. For example, the digital content design system 102 can fine-tune fully-connected layers of an InceptionV3 network to use as an aesthetics neural network. In addition, the digital content design system 102 can train the aesthetics neural network based on a large-scale visual aesthetics dataset. As used herein, the term "aesthetics score" refers to a score that indicates a clarity, a focus, a visual appeal, or a beauty rating of a digital image or a video frame.

More specifically, the digital content design system 102 can apply an aesthetics neural network that is trained to identify frames that are visually appealing and/or that have a certain level of clarity. To that end, the aesthetics neural network can generate aesthetics scores on a scale from 0 to 1, where higher scores correspond to frames that are more visually appealing and/or clearer. In other embodiments, the aesthetics neural network can generate binary scores (e.g., 0 or 1), where frames that have a satisfactory level of visual appeal and/or clarity are scored with a 1 and those that do not are scored with a 0. In any event, the digital content design system 102 can utilize the aesthetics neural network to identify those frames of the input digital video that are visually suitable to use in generating a digital video summary. In some embodiments, the digital content design system 102 can ignore those frames of the digital video that do not satisfy a particular aesthetics score threshold or, in the case of binary aesthetics scores, that have a score of 0.

As another aspect of generating the digital video summary by utilizing the summarizer neural network 304, the digital content design system can utilize a relevancy neural network to generate relevancy scores for frames of the input digital video. In particular, the digital content design system 102 can utilize a relevancy neural network trained to identify individual frames that are relevant to the content of a digital video as a whole. Similar to the scoring of the aesthetics neural network, the relevancy neural network can generate scores on a scale from 0 to 1 or binary scores of 0 or 1 to rate individual frames of a digital video to reflect their relevancy with respect to the original input digital video as a whole. As used herein, the term "relevancy neural network" refers to a neural network that generates importance (or relevancy) scores. For instance, a relevancy neural network can include a convolutional neural network and/or a long short-term memory ("LSTM") network. In particular, a relevancy neural network can include a convolutional neural network that the digital content design system 102 utilizes to generate a sequence of deep features for frames of a digital video.

The digital content design system 102 can further train the relevancy neural network based on training data such as training images/frames and training relevancy scores. Thus, the digital content design system 102 can train the relevancy neural network to improve in accuracy by repeating the process of analyzing a digital video frame, predicting a relevancy score, comparing the predicted relevancy score with a ground truth training relevancy score to determine a measure of loss, and minimizing the measure of loss.

Additionally, the digital content design system 102 can generate selection scores for frames of a digital video based on the aesthetics scores and the relevancy scores. To elaborate, the digital content design system 102 can generate selection scores that indicate whether or not given frames are suitable for use in a digital video summary. As used herein, the term "selection score" refers to a score or rating for selecting a frame from a digital video. In particular, the term selection score includes a rating that indicates how well a given frame represents a digital video based on aesthetic considerations as well as relevance considerations. In some embodiments, the digital content design system 102 can generate selection scores by generating a linear combination of aesthetics scores and relevancy scores. In other embodiments, the digital content design system 102 can generate discretized/binary selection scores, where a 0 indicates a frame that will not be selected and a 1 indicates a frame that will be selected.

The digital content design system 102 generates selection scores $s_t$ by generating linear combinations of importance scores $i_t$ and the aesthetics scores $q_t$. Indeed, the digital video summary system 102 generates a linear combination given by:

$$s_t = \alpha i_t + \beta q_t$$

where $s_t$ represents a selection score, $i_t$ represents a corresponding importance score, $q_t$ represents a corresponding aesthetics score, $\alpha$ represents a weight for the importance score, and $\beta$ represents a weight for the aesthetics score. By considering both the importance scores and the aesthetics scores, the digital content design system 102 selects frames of a digital video that are both aesthetically appealing and relevant to include in the digital video summary. In some embodiments, the digital content design system 102 can receive user input to set $\alpha$ and $\beta$, while in other embodiments, the weight parameters may be system-defined. For example, in some embodiments, the digital content design system 102 can set $\alpha=0.75$ and $\beta=0.25$.

In addition, the digital content design system 102 selects a subset of frames for the digital video summary based on the importance scores. To select summary frames, the digital content design system 102 can weight a feature vector of each frame by its corresponding selection score. Thus, in some embodiments the digital content design system 102 selects one or more frames that have the greatest weight or the highest selection score(s) for the digital video summary. Indeed, the digital content design system 102 can select a single frame to generate a thumbnail digital video summary or the digital content design system 102 can select multiple frames to generate a storyboard, an animated thumbnail, or a video trailer.

For example, to generate a storyboard, the digital content design system 102 can select multiple frames throughout the digital video to represent the digital video when viewed together. To generate an animated thumbnail, the digital content design system 102 can select a number of frames that, when played together in a playable video format, represent the digital video as a whole. Similarly, to generate a video trailer, the digital content design system 102 can segment a digital video and select one or more frames from the different segments. The digital content design system 102 can further arrange the selected frames in temporal order so that, when played together, the frames form a video trailer that represents the digital video.

The digital content design system 102 can also modify the duration of the resulting digital video summary. For example, the digital content design system 102 can adjust the subset of frames selected by the metadata neural network (e.g., by setting a maximum or minimum threshold of frames), and thereby control the duration of the resulting digital video summary.

Furthermore, the digital content design system 102 utilizes a reconstructor in the form of a generative reconstructor neural network that can include an autoencoder, a variational autoencoder ("VAE"), or a generative adversarial network ("GAN"). In other embodiments, however, the generative reconstructor neural network can include different types of neural networks. Indeed, as used herein, the term "generative reconstructor neural network" refers to one or more neural networks that generates a digital video reconstruction based on selected frames of an original digital video. For example, a generative reconstructor neural network can refer to an LSTM autoencoder which consists of a bidirectional LSTM encoder and a bidirectional LSTM decoder. In other embodiments, a generative reconstructor neural network can refer to a variational autoencoder and/or a generative adversarial network.

By utilizing a generative reconstructor neural network, the digital content design system 102 efficiently generates a reconstructed digital video based on selection scores of frames of the original digital video. In particular, the digital content design system 102 utilizes the selection scores as an attention mechanism within an encoder layer to draw attention to summary frames and accurately reproduce a digital video reconstruction from the summary frames. Thus, by utilizing a generative reconstructor neural network, the digital content design system 102 more efficiently generates the reconstructed digital video relative to alternative systems by requiring less training data than supervised models.

In addition, the digital content design system 102 can repeat the process of generating digital video summaries to improve in accuracy. Indeed, the digital content design system 102 can continuously perform iterations of the process until a determined loss of the summarizer neural network 304 is within a threshold loss. To illustrate, the digital content design system 102 can repeat the process of generating a summarized digital video, generating a reconstructed digital video, determining a loss between the reconstructed digital video and the original digital video, and minimizing the determined loss.

As mentioned, the digital content design system 102 can generate digital video summaries of varying duration and of varying type. To illustrate, the digital content design system 102 can generate a digital video summary (via the summarizer neural network 304) in the form of a thumbnail, a storyboard, an animated thumbnail, or a video trailer. In some embodiments, the digital content design system 102 receives user input to select a type of digital video summary to generate by, for example, receiving a user selection of an option to generate a thumbnail.

In these or other embodiments, the digital content design system 102 generates and provides a recommended modification to change the type of digital video summary based on a generated performance metric. For instance, the digital content design system 102 analyzes (utilizing the various neural networks) different digital video summaries (e.g., thumbnails, storyboards, animated thumbnails, and/or video trailers) to determine digital video summaries that have an improved performance metric. In turn, the digital content design system 102 provides a recommendation to modify the type of the digital video summary to select the type that results in an improved (e.g., highest) performance metric.

In other embodiments, however, the digital content design system 102 automatically generates a digital video summary to improve a performance metric. For example, the digital content design system 102 analyzes various digital video summaries to determine which digital video summary results in the highest performance metric. In these embodiments, the digital content design system 102 automatically (e.g., without user input) selects the digital video summary that corresponds to an improved (e.g., highest) performance metric.

In addition, the digital content design system 102 can change the duration of the digital video summary. Particularly, the digital content design system 102 can receive user input to change a duration of a digital video summary or the digital content design system 102 can automatically change a duration of a digital video summary. As mentioned above, to change the duration of a digital video summary, the digital content design system 102 can modify a number of frames selected by the summarizer neural network 304 to adjust the temporal length of the resulting digital video summary. For example, the digital content design system 102 can shorten the duration of a video trailer by reducing the number of frames or segments selected for the video trailer.

Similar to the above discussion of modifying the type of digital video summary, the digital content design system 102 can further generate and provide recommendations to modify a duration of a digital video summary by determining a number of frames for a digital video summary that results in an improved (e.g., highest) performance metric. Indeed, the digital content design system 102 can analyze digital video summaries of varying durations to determine which duration (e.g., number of frames or temporal length) results in an improved performance metric. Additional detail regarding the architecture of the summarizer neural network 304 is provided below with reference to FIG. 5.

As the foregoing discussion provides, the digital content design system can generate a variety of different digital video summaries of a variety of different durations. Additional detail regarding utilizing a summarizer neural network to generate digital video summaries is provided by V. Swaminathan and H. Gu in Generating Digital Video Summaries Utilizing Aesthetics, Relevance, and Generative Neural Networks, U.S. patent application Ser. No. 16/004,170 (filed Jun. 8, 2018), which is incorporated by reference herein in its entirety.

As shown in FIG. 3, the digital content design system 102 can further utilize a metadata neural network 306 to generate metadata associated with the input digital video. As shown, the metadata neural network 306 can analyze features from the digital video (as generated by the featurizer neural network 302) as well as other features to generate metadata. For instance, the metadata neural network 306 can receive video features and audio features from the featurizer neural network 302. The metadata neural network 306 can also receive other features, such as textual features corresponding to the digital video, combined audio-visual features corresponding to the digital video, sentiment features, or other associated content features. In one or more embodiments, the metadata neural network 306 includes one or more layers for extracting features associated with the digital video. Thus, in addition to (or in the alternative to) the featurizer neural network 302, the metadata neural network 306 can generate video features, audio features, audio-visual features or other features.

Based on the extracted features (e.g., video features and audio features), the digital content design system 102 can utilize pooling layers to generate feature vectors. In particular, the digital content design system 102 can utilize a first learnable pooling layer to analyze the video features and generate a video feature vector. Similarly, the digital content design system 102 can utilize a second learnable pooling layer to analyze the audio features and generate an audio feature vector. Although not illustrated, the digital content design system 102 can also utilize additional learnable pooling layers for other features (e.g., combined audio-visual features and/or sentiment features). As used herein, the term "learnable pooling layer" refers to a layer within a neural network that performs a pooling operation (e.g., a pooling operation that is trainable). For example, a learnable pooling layer can include at least one trainable bias term. In some embodiments, however, the digital content design system 102 can utilize a different type of pooling layer such as a max pooling layer instead of a learnable pooling layer.

Furthermore, the digital content design system 102 can utilize a fully connected layer as part of the metadata neural network 306 to analyze the visual feature vector and the audio feature vector (or other feature vectors) to generate metadata for a digital video. In some embodiments, the digital content design system 102 utilizes the fully connected layer to generate probabilities with respect to various keywords. For example, the digital content design system 102 generates, for a number of potential keywords, a probability that a given keyword matches (corresponds to) the digital video. The digital content design system 102 can further identify those keywords whose corresponding probability satisfies a threshold score as keywords that match the digital video. Thus, the digital content design system 102 can utilize the metadata neural network 306 to generate metadata that relates to content of a digital video.

Although not illustrated in FIG. 3, the digital content design system 102 can generate predictions from multiple models (e.g., multiple neural network architectures). The digital content design system 102 can further utilize, as part of the metadata neural network 306, one or more gating networks together with a mixture of experts approach to combine results from various models. For instance, the digital content design system 102 can implement a context gating layer to introduce nonlinear interdependencies among features (as well as output labels). Moreover, context gating can recalibrate the output class probabilities according to the learnt prior structure of the output label space. In addition, the digital content design system can utilize a mixture of experts approach to combine different models.

As mentioned, the digital content design system 102 can train the metadata neural network 306. To train the metadata neural network 306, the digital content design system 102 can utilize training data such as ground truth keywords corresponding to training images, training video, and/or training audio. For example, the digital content design system 102 can analyze a training image using the metadata neural network 306 to generate predicted metadata (e.g., keywords) and can compare the predicted keywords with ground truth keywords. The digital content design system 102 can determine a measure of loss and can further minimize the loss by modifying parameters of the metadata neural network 306 to increase in accuracy of generating metadata.

As the foregoing disclosure suggests, the digital content design system 102 can generate metadata by utilizing a metadata neural network that analyzes audio, video, and other features. Additional detail regarding generating metadata utilizing a metadata neural network is provided in V. Swaminathan, S. Sarkhel, S. Mitra, and J. Martinez in Metadata Generation for Videos, U.S. patent application Ser. No. 16/028,352 (filed Jul. 5, 2018), which is incorporated herein by reference in its entirety.

As further illustrated in FIG. 3, the digital content design system 102 can utilize a performance neural network 308 to generate a performance metric. In particular, the digital content design system 102 can generate a performance metric based on a generated digital video summary and generated metadata. Furthermore, the digital content design system 102 can train the performance neural network 308 based on historical data and/or distribution parameters. Indeed, the digital content design system 102 generates a performance metric for the digital video summary by utilizing a trained performance neural network 308. Although not illustrated in FIG. 3, the digital content design system 102 can alternatively utilize an original digital video (as opposed to a digital video summary) as input for generating a performance metric.

To elaborate, the digital content design system 102 can utilize a performance neural network 308 that includes a visual prediction model for generating predicted visual performance metrics based on video data of the digital video summary. As used herein, a "visual prediction model" refers to a computer algorithm or model that generates a predicted visual performance metric. In particular, a visual prediction model includes a neural network or other machine learning architecture trained to identify and analyze visual features of a digital video to predict performance of the digital video upon dissemination to a client device. For example, a visual prediction model can include a convolutional neural network that generates a feature vector for frames of a digital image and a recurrent neural network that includes bi-directional long short term neural network layer that analyzes the feature vector (based on the sequence of the frames of the digital video) to generate a predicted visual performance metric.

To illustrate, the digital content design system 102 can extract visual features from the digital video (or, as shown, utilize features extracted by the featurizer neural network 302) to generate a visual feature representation (e.g., a multi-dimensional feature vector) representative of the visual features of the digital video. The digital content design system 102 can further apply a bidirectional long short-term memory ("LSTM") network to the visual feature representation to generate a predicted visual performance metric representative of a predicted performance of the digital video based on the visual features of the digital video.

The performance neural network 308 can also include a text prediction model for generating textual performance metrics. As used herein, a "text prediction model" refers to a computer algorithm or model that generates a predicted textual performance metric. In particular, a textual prediction model includes a machine learning model (e.g., neural network, supervised learning classifier, decision tree, Naïve Bayes classifier, or other machine learning architecture) trained to identify and analyze textual features of a digital video to predict performance of the digital video upon dissemination to a client device. For example, in one or more embodiments, the text prediction model includes a textual feature extractor that maps text (e.g., metadata) associated with a digital video to a text vector and a multi-class classifier (e.g., a Naïve Bayes classifier) trained to determine a predicted visual performance metric based on identified text vector.

Indeed, the digital content design system 102 can identify text associated with the digital video (e.g., metadata such as topics, keywords, etc.) to generate a textual representation of the digital video. The digital content design system 102 can further apply a text predictor (e.g., a multi-class classifier trained using the Naïve Bayes model) to the textual representation of the digital video to generate a predicted textual performance metric representative of a predicted performance of the digital video based on the identified text associated with the digital video.

Furthermore, the performance neural network 308 includes a multi-modal combination model for generating composite performance metrics. As used herein, a "multi-modal combination model" refers to a computer algorithm (e.g., a mixture model or some other probabilistic model) trained to determine a composite performance metric. In particular, a multi-model combination model includes a computer algorithm trained to analyze multiple predicted performance metrics associated with a predicted performance of distributing a digital video (e.g., visual performance metrics and textual performance metrics) and generate a composite performance metric. For example, in one or more embodiments, a multi-modal combination model refers to a probabilistic model trained to combine two or more distributions of predicted performance values or classifications. For instance, in one or more embodiments, the digital content design system 102 trains the multi-modal combination model by learning weights (based on historical data) to apply to predicted performance metrics to generate a composite performance metric. Accordingly, as used herein, a "composite performance metric" refers to a score, value, or distribution (e.g., probability distribution), based on text corresponding to a digital video and visual features corresponding to the digital video, reflecting a predicted action, occurrence, or event upon distributing the digital video to one or more client devices.

Thus, the digital content design system 102 can utilize a trained multi-modal combination model to perform a combination of a predicted visual performance metric determined by the visual prediction model and a predicted textual performance metric determined by the text prediction model to output a composite performance metric based on both the outputs of the visual prediction model and the text prediction model. In one or more embodiments, the digital content design system 102 utilizes the multi-modal combination model to determine the combined performance metric by learning weights and applying the learned weights to the respective predicted visual performance metric and predicted textual performance metric.

As mentioned, the digital content design system 102 can train the performance neural network 308 to generate the performance metric based on historical data. For example, the performance neural network 308 can analyze historical data such as training video data and training textual data. Indeed, the visual prediction model, text prediction model, and multi-modal prediction model are trained based on training performance data associated with a set of training digital videos. As user herein, "training performance data" refers to historical data associated with actions of training users with respect to training digital videos previously distributed to client devices of the training users. For example, training performance data can include identified clicks and other interactions by viewers of respective training digital videos positive or negative impressions by viewers, and tracked conversion rates associated with one or more actions taken by viewers of the training digital videos.

Additionally, as illustrated in FIG. 3, the digital content design system 102 can train the performance neural network 308 to generate the performance metric based on distribution parameters. To elaborate, the performance neural network 308 can utilize distribution parameters as training data with historical data. Thus, in addition to training the performance neural network 308 based on video data and textual data, the digital content design system 102 can train the performance neural network 308 based on training distribution parameters utilized for the video (e.g., the distribution channel utilized to distribute the digital video).

In some embodiments, the digital content design system 102 can train the performance neural network 308 to generate predicted performance metrics based on particular training distribution parameters. For example, the digital content design system 102 can set a training distribution channel such as one or more social networks and the performance neural network 308 can generate a predicted performance metric. The digital content design system 102 can compare the predicted performance metric with a ground truth performance metric to determine a measure of loss. The digital content design system 102 can further minimize the measure of loss to improve the accuracy of the performance neural network 308 in generating performance metrics with respect to individual distribution parameters. To obtain the ground truth performance metrics in relation to distribution parameters, the digital content design system 102 can utilize historical data that indicates past performances using the same distribution parameters. Additionally (or alternatively), the digital content design system 102 can crowd source the information by collecting data for digital video distribution via various distribution channels at various times of day, and to different target audiences.

In some embodiments, the digital content design system 102 can train multiple separate performance neural networks 308 based on different training distribution parameters. In other embodiments, the digital content design system 102 can train a single performance neural network 308 conditioned on each of the various distribution parameters.

As the foregoing explains, the digital content design system 102 can predict performance metrics for digital content based on a variety of parameters. Additional detail regarding utilizing a performance neural network to predict performance metrics for digital content is provided by V. Swaminathan, S. Sarkhel, S. Mitra, and Q. Lou in Utilizing A Trained Multi-Modal Combination Model For Content And Text-Based Evaluation And Distribution Of Digital Video Content To Client Devices, U.S. patent application Ser. No. 16/009,559 (filed Jun. 15, 2018), which is incorporated herein by reference in its entirety.

While FIG. 3 illustrates a particular arrangement of components of the digital content design system 102 including the featurizer neural network 302, the summarizer neural network 304, the metadata neural network 306, and the performance neural network 308, in some embodiments the digital content design system 102 can have a different arrangement and/or composition of components. For example, in some embodiments, the performance neural network 308 receives video features directly from the featurizer neural network 302 without first generating a digital video summary via the summarizer neural network 304. In the same or other embodiments, the digital content design system 102 can utilize the performance neural network 308 to generate a performance metric without first generating metadata via the metadata neural network 306. For instance, the digital content design system 102 can scrub digital content (e.g., a digital video) for metadata content by identifying tagged frames, subtitles, or other metadata associated with the digital content.

In some embodiments, though not shown in FIG. 3, the digital content design system 102 can utilize the metadata neural network 306 to generate metadata for a digital video summary in addition (or alternatively) to generating metadata for the input digital video. For example, the metadata neural network 306 can receive a generated digital video summary as input for generating metadata for the digital video summary. Thus, the performance neural network 308 can generate a performance metric for a digital video summary based on the digital video summary as well as the corresponding generated metadata.

In some embodiments, the digital content design system 102 can generate a performance metric (via the performance neural network 308) for an input digital video. Based on the generated performance metric, the digital content design system 102 can generate a digital video summary to improve the performance metric. Indeed, as described above, the digital content design system 102 can receive user input to generate a digital video summary or the digital content design system 102 can automatically generate a digital video summary having a particular type and duration to improve the performance metric of the input digital video.

In addition to summaries of different types and duration, the digital content design system 102 can also utilize the architecture illustrated in FIG. 3 to generate a variety of other modifications to digital content to improve performance metrics. For example, the digital content design system 102 can modify color or audio of digital content to identify modifications that will improve resulting performance metrics. To illustrate, the digital content design system 102 can modify color schemes within digital content and utilize the performance neural network 308 to determine color schemes that improve performance of the digital content. The digital content design system 102 can then recommend a modified color palette (e.g., the color palette corresponding to the highest performance metric).

Accordingly, the digital content design system 102 can utilize artificial intelligence frameworks to flexibly generate a variety of valuable insights in planning a digital content campaign, including metadata, performance metrics, digital video summaries, recommended digital content modifications, or recommended distribution parameters.

Figure 4:
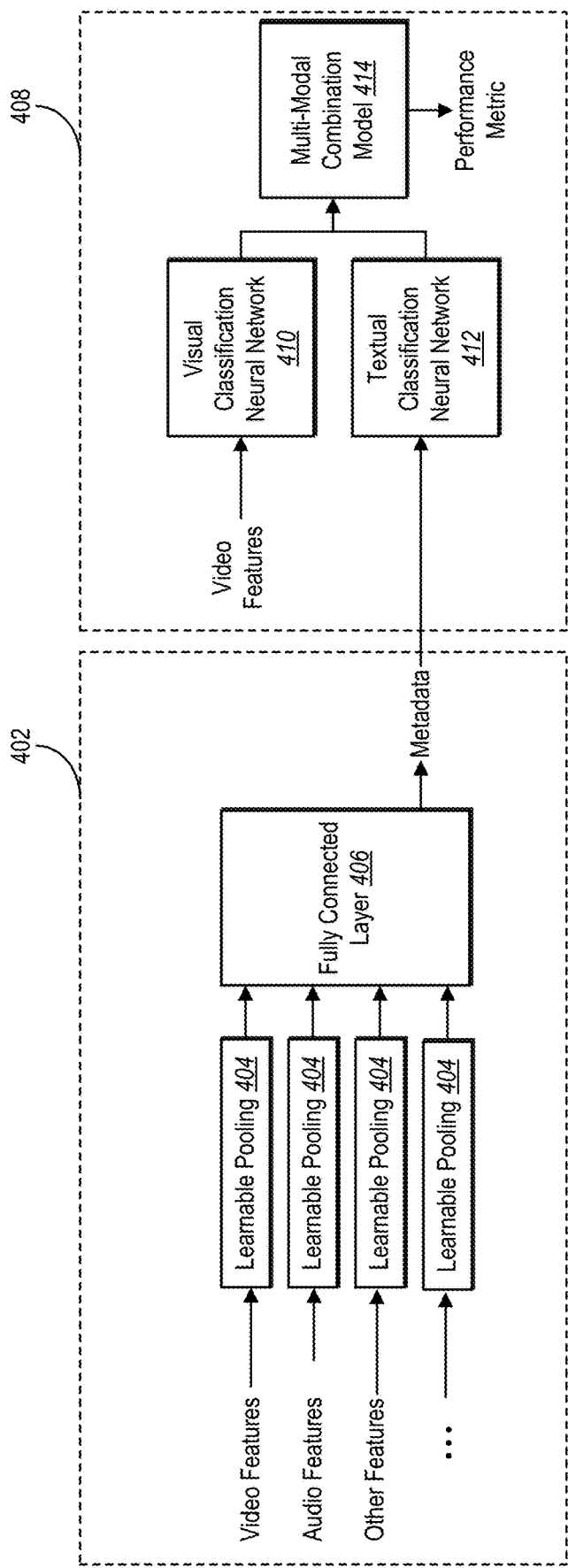
FIG. 4 illustrates an example organization of components of the digital content design system for generating a performance metric in accordance with one or more embodiments.

As mentioned, the digital content design system 102 can utilize a metadata neural network 306 having a particular architecture. FIG. 4 illustrates an example architecture of a metadata neural network 402 (e.g., the metadata neural network 306) in accordance with one or more embodiments. As shown, the metadata neural network 402 includes learnable pooling layers 404 and a fully connected layer 406. In line with the description above, the metadata neural network 402 can extract features from a digital video (and/or utilize features extracted utilizing the featurizer neural network 302). For example, the metadata neural network 402 extracts video features, audio features, and other features. To extract the features, the metadata neural network 402 can implement an InceptionV3 model along with a principal component analysis ("PCA") and/or a whitening technique.

For each respective type of extracted feature, the metadata neural network 402 further includes a corresponding learnable pooling layer 404. In particular, the metadata neural network 402 can utilize models with pooling layers from a particular neural network such as NetVLAD, NetRVLAD, or NetFV, among others. By utilizing learnable pooling layers, the metadata neural network 402 learns weights for the video features, audio features, etc., independently. As shown, the metadata neural network 402 analyzes the video features using a first learnable pooling layer 404. The metadata neural network 402 further generates a video feature vector using the first learnable pooling layer 404. The metadata neural network 402 also analyzes the audio features using a second learnable pooling layer 404. Additionally, the metadata neural network 402 generates an audio feature vector using the second learnable pooling layer 404. For any other types or classes of features such as combined audio-visual features, contextual features, existing metadata features, or others, the metadata neural network 402 uses corresponding learnable pooling layers to analyze the features and to generate corresponding feature vectors.

As shown in FIG. 4, the metadata neural network 402 further includes a fully connected layer 406. In particular, the metadata neural network 402 utilizes the fully connected layer 406 to analyze the various features together and generate metadata based on the feature vectors of the learnable pooling layers. In other words, the individual pooling layers allow the metadata neural network 402 to learn significant features by analyzing audio, visual, and other features individually at different levels of abstraction. The fully connected layer 406 allows for the metadata neural network 402 to learn combinations of different features significant to predicting particular keywords. More specifically, the metadata neural network 402 utilizes the fully connected layer 406 to combine the output tensors from the learnable pooling layers by, for example, adding an additional input stream to combine the output activations.

By utilizing the fully connected layer 406, the metadata neural network 402 can generate metadata in the form of keywords and corresponding confidence scores. For example, the metadata neural network 402 can generate a particular number of keywords (e.g., 5 or 10) that each correspond to a confidence score. As another example, the metadata neural network 402 can generate keywords whose confidence scores sum to 1. Thus, the metadata neural network 402 can generate one keyword with a confidence score of 0.6, another keyword with a confidence score of 0.3, and a third keyword with a confidence score of 0.1 so that the three confidence scores sum to 1.

As mentioned, the metadata neural network 402 can utilize a variety of different architectures for the metadata neural network 402. For example, the metadata neural network 402 can utilize a 3-Stream NetVLAD, 3-Stream NetRVLAD, and/or a 3-Stream NetFV. In other embodiments, the metadata neural network 402 can include one or more recurrent neural networks ("RNNs") and/or LSTM layers. As discussed above, in one or more embodiments, the metadata neural network 402 utilizes multiple different models and combines the results (e.g., utilizing a mixture of experts approach and context gating). Indeed, in one or more embodiments, the metadata neural network 402 utilizes a stacked generalization algorithm, which allows the digital content design system 102 to learn combinations (e.g., optimal combinations) of predictions from different models. For example, by comparing ground truth results with predicted results from various models, the digital content design system 102 can learn weights to apply to various models that then combine for an accurate output prediction. In particular, the stacked generalization algorithm can use a logistic regression to learn weights assigned to various specific models.

As mentioned, the digital content design system 102 further utilizes a performance neural network 308 to generate a performance metric for a digital video. In addition to the above-described architecture of the metadata neural network 402, FIG. 4 further illustrates an example architecture of a performance neural network 408 (e.g., the performance neural network 308) in accordance with one or more embodiments. As shown, the performance neural network 408 analyzes video features utilizing a visual prediction neural network 410. In particular, the visual prediction neural network 410 generates visual feature vectors corresponding to the visual video features. As described above, based on the visual feature vectors, the performance neural network 408 further utilizes a visual feature predictor to generate a visual performance metric as the output of the visual prediction neural network 410.

As also shown, the performance neural network 408 analyzes the metadata generated by the metadata neural network 402 (and/or other textual data corresponding to a digital video) utilizing a text prediction neural network 412. In particular, the performance neural network 408 utilizes a textual feature predictor to generate, as the output of the text prediction neural network 412, a textual performance metric based on the features of the generated metadata. For example, as described, the text prediction neural network 412 can be a logistic regression model or a different type of machine learning model.

As mentioned above, the digital content design system 102 also utilizes a multi-modal combination model 414 to combine visual performance metrics and textual performance metrics. Indeed, the multi-model combination model 414 can generate composite performance metrics. For example, based on predicted performance metrics from the visual prediction neural network 410 and text prediction neural network 412 (as inputs to the multi-modal combination model 414), the multi-modal combination model 414 generates a composite performance metric $p_c(x)$ in accordance with the following:

$$p_c(x) = \alpha_1 p_1(x) + \alpha_2 p_2(x)$$

where $p_1(x)$ refers to a predicted visual performance metric, $p_2(x)$ refers to a predicted textual performance metric, and $\alpha_1$ and $\alpha_2$ refer to weights associated with a learned importance of each of the predicted performance metrics.

As also mentioned, where the digital content design system 102 can include additional prediction models (e.g., an audio-based prediction model). In these embodiments, the, the digital content design system 102 can provide one or more additional predicted performance metrics as inputs to the multi-modal combination model 414. Accordingly, in one or more embodiments, the digital content design system 102 can generate a composite performance metric $p_c(x)$ in accordance with the following:

$$p_c(x) = \Sigma_i \alpha_i p_i(x)$$

where i refers to a characteristic (e.g., visual, audio, textual) of the digital video, $\alpha_i$ refers to a weight for a respective characteristic of the digital video, and $p_i(x)$ refers to a predicted performance metric for a respective characteristic of the digital video.

In addition, the digital content design system 102 can train the multi-modal combination model 414. The digital content design system 102 can train the multi-model combination model 414 by comparing training visual performance metrics, the training textual performance metrics, and training performance data. For instance, the digital content design system 102 trains the multi-modal combination model 414 by performing a convex combination of the training visual performance metrics and training textual performance metrics to fit a distribution of performance metrics from the training performance data. In one or more embodiments, the digital content design system 102 trains the multi-modal combination model 414 to determine mixture weights that, when applied to the respective training performance metric, maximize a fit between combination performance metrics and the training performance data.

To illustrate, in one or more embodiments, the digital content design system 102 determines the mixture weights by employing an expectation-maximization (EM) algorithm. In particular, the digital content design system 102 iteratively estimates parameters that maximize a fit between the training performance data in combination with the training visual performance metrics and training textual performance metrics. For instance, the digital content design system 102 can utilize an expectation-maximization (EM) algorithm that iteratively alternates between performing an expectation step (e.g., estimating a function for the expectation of the log-likelihood using a current estimate), and a maximization step (e.g., computing parameters that maximize the expected log-likelihood). In this manner, the digital content design system 102 can estimate mixture weights that maximize the similarity between combined performance metrics and the training performance data.

As mentioned above, the digital content design system 102 can train the visual prediction neural network 410, the text prediction neural network 412, and/or the multi-model combination model 414 in parallel (individually) or jointly. In some embodiments, the digital content design system 102 trains the models in parallel, thereby improving scalability of the training framework.

Figure 5:
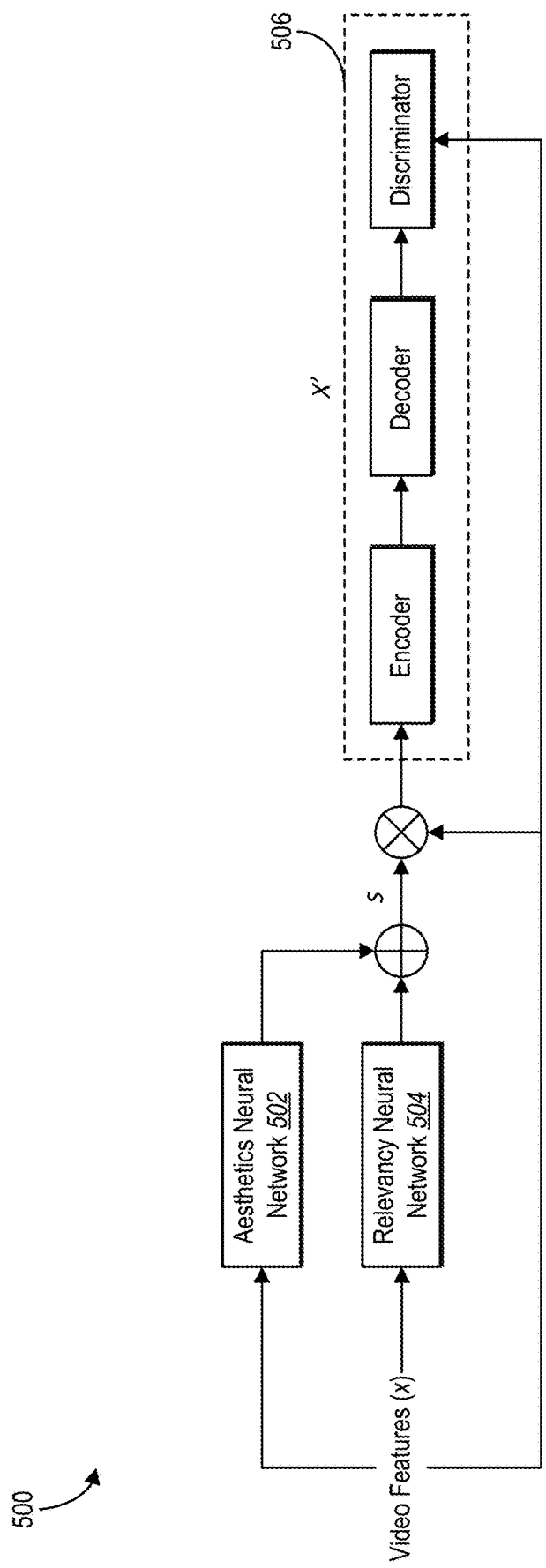
FIG. 5 illustrates example architectures of a metadata neural network and a performance neural network in accordance with one or more embodiments.

As mentioned above, the digital content design system 102 utilizes a summarizer neural network to generate a digital video summary of an input digital video. FIG. 5 illustrates an example architecture of a summarizer neural network 500 (e.g., the summarizer neural network 304) in accordance with one or more embodiments. As described, and as set forth in detail in the above-cited Generating Digital Video Summaries Utilizing Aesthetics, Relevance, and Generative Neural Networks, the summarizer neural network 500 can include an aesthetics neural network 502. The aesthetics neural network 502 can generate aesthetics scores for frames of a digital video x.

As shown, the summarizer neural network 500 can further include a relevancy neural network 504. As described, and as also set forth in detail in the above-cited Generating Digital Video Summaries Utilizing Aesthetics, Relevance, and Generative Neural Networks, the relevancy neural network 504 can generate relevancy scores for frames of a digital video. The summarizer neural network 500 can further utilize the relevancy scores and the aesthetics scores to generate selection scores that are a composite (e.g., a linear combination) of the relevancy scores and the aesthetics scores.

Additionally, the summarizer neural network 500 can generate a selection s of a subset of frames of the digital video x based on selection scores of the frames. Furthermore, the summarizer neural network 500 can include a generative reconstructor neural network 506 to generate a reconstructed digital video x'. As shown in FIG. 5, the generative reconstructor neural network 506 is a GAN that includes an encoder, a decoder, and a discriminator. To elaborate, the summarizer neural network 500 can include a generator (e.g., which can include the encoder and the decoder) in competition with the discriminator. For example, the generator generates digital video reconstructions in an attempt to fool the discriminator into identifying them as the original digital video. The generator generates such reconstructions based on a generator loss function. The discriminator distinguishes between real (e.g., original) and fake (e.g., reconstructed) videos based on a discriminator loss function. By repeating the process of generating and testing frames and modifying parameters of the summarizer neural network 500, the discriminator and the generator each get more and more accurate.

In other embodiments, instead of using a GAN, the summarizer neural network 500 can include an autoencoder or a VAE. For instance, in embodiments where the summarizer neural network 500 includes a VAE, the structure can be similar to that shown in FIG. 5, but without the discriminator. In other words, the generative reconstructor neural network 506 can include the encoder and the decoder. To elaborate on utilizing a VAE, the summarizer neural network 500 utilizes the encoder to generate a small, dense representation of input data (e.g., selected frames) in the form of latent vectors specifically useful for reconstructing its own output based on a loss function (i.e., a negative log-likelihood with a regularizer). In particular, the a VAE can be trained utilizing a reconstruction loss and a prior loss (e.g., the Kullback-Leibler divergence between the encoder's generation distribution and an input distribution).

To illustrate, in embodiments where the summarizer neural network 500 includes a VAE, the digital content design system 102 implements a directed graphical model which defines a posterior distribution over observed data, given an unobserved latent variable. In these embodiments, the digital video summary system 102 can determine reconstruction loss by utilizing a negative log likelihood distribution function (i.e., a cross entropy loss function).

Regardless of the type of generative reconstructor neural network 506, the summarizer neural network 500 generates a reconstructed digital video x'. Additionally, as described above, the digital content design system 102 trains the summarizer neural network 500 to generate a reconstructed digital video x' that is within a threshold similarity of the original digital video x. To do so, the digital content design system 102 determines a loss between the reconstructed digital video x' and the original digital video x using one or more loss functions (which functions vary depending on the type of generative reconstructor neural network 506 used), as set forth in detail in the above-cited Generating Digital Video Summaries Utilizing Aesthetics, Relevance, and Generative Neural Networks for the summarizer neural network 500. The digital content design system 102 further minimizes the loss by modifying various neural network parameters (weights) to generate a subset s of frames that results in a more accurate reconstructed digital video x'—one that more closely resembles the input digital video x. The digital content design system 102 repeats the process of generating reconstructions, comparing, and minimizing loss to improve the subset of frames until the summarizer neural network 500 can produce a subset s that results in a reconstructed digital video x' with a loss that satisfies a threshold.

As mentioned, the digital content design system 102 can provide a user interface to a publisher device whereby a publisher associated with the publisher device can plan, set up, modify, arrange, or organize a digital content campaign. In particular, the digital content design system 102 can provide a user interface for generating digital content summaries and for determining predicted performance metrics for the digital content summaries.

Figure 6:
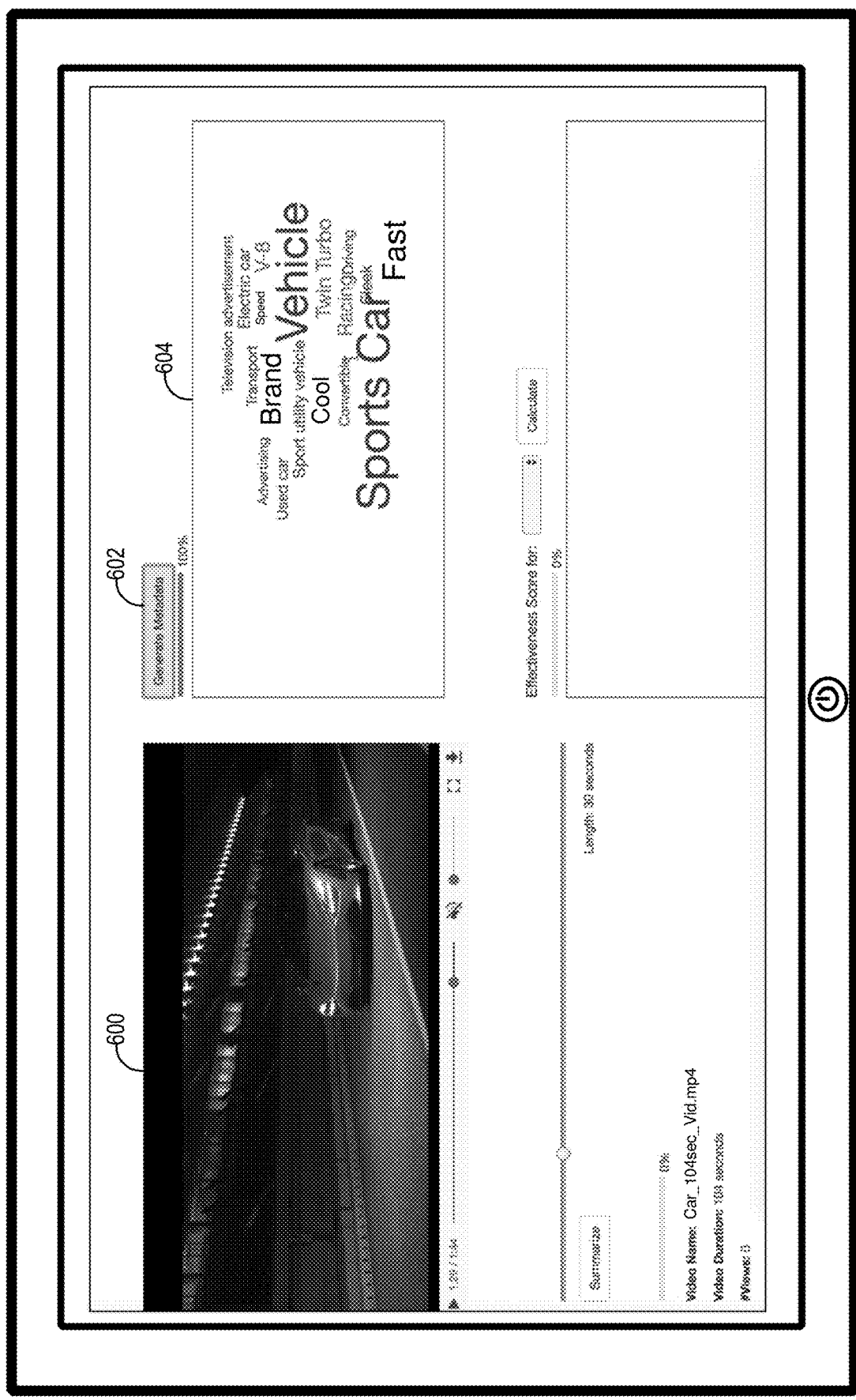
FIG. 6 illustrates an example architecture of a summarizer neural network in accordance with one or more embodiments.

FIG. 6 illustrates a user interface as displayed on a publisher device 606, including a digital video 600, a generate metadata element 602, and generated metadata 604. Although FIG. 6 (and the subsequent figures) illustrate a user interface with a particular layout, the digital content design system 102 can also provide a user interface having a different layout or aesthetic, while still providing the same or similar functionality to a publisher.

As shown in FIG. 6, the digital content design system 102 provides a digital video 600 via the publisher device 606. The digital content design system 102 can receive the digital video 600 from a publisher device as an upload or via a file path designation. Upon receiving the digital video 600, the digital content design system 102 can provide various information about the video such as the video name, video duration, number of views, etc., for display.

As also shown, the digital content design system 102 can provide selectable elements such as the generate metadata element 602. Based on receiving a user interaction with the generate metadata element 602, the digital content design system 102 can perform one or more of the techniques and methods described herein to generate metadata for the digital video 600. More specifically, the digital content design system 102 can utilize a metadata neural network (e.g., the metadata neural network 402) to analyze the digital video and generate relevant metadata 604.

As illustrated in FIG. 6, the digital content design system 102 can generate the metadata 604 in the form of keywords. Particularly, in some embodiments the digital content design system 102 can generate a tag cloud that shows keywords relevant to the digital video 600 and that further shows a degree of relevance based on the size and/or color of the keywords. For instance, larger keywords such as "Sports Car" and "Vehicle" within the tag cloud can represent concepts that are more relevant to the digital video 600.

Figure 7:
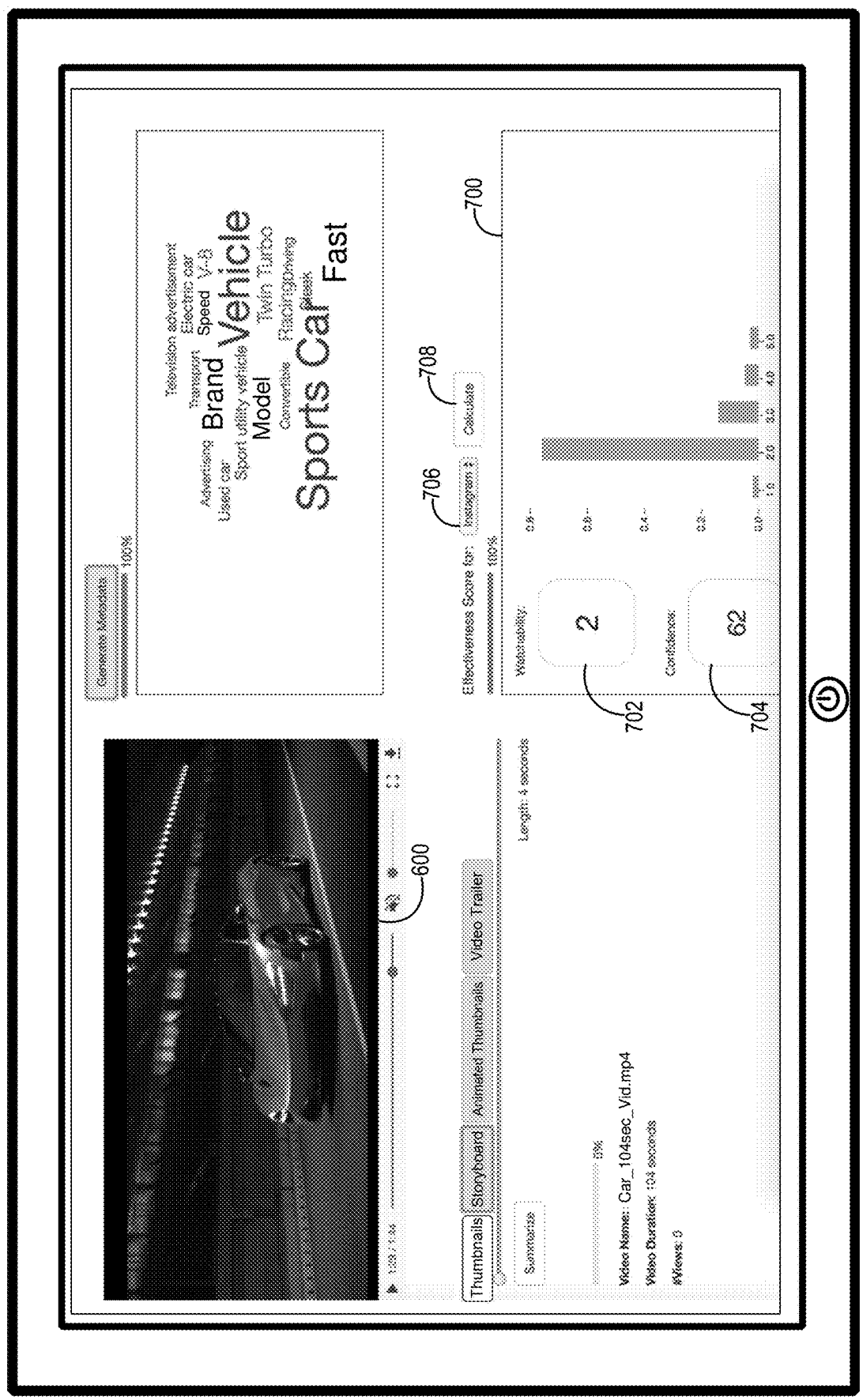
FIG. 7 illustrates an example user interface for generating metadata for a digital video in accordance with one or more embodiments.

Based on the metadata 604, and as described above, the digital content design system 102 can generate a performance metric for the digital video 600. Indeed, FIG. 7 illustrates a user interface that includes the digital video 600 and that further includes a performance metric display 700.

Based on receiving an interaction with the calculate element 808, the digital content design system 102 can generate a performance metric 702 and a corresponding confidence score 704 for the performance metric 702. As shown in FIG. 7, the performance metric 702 can indicate a "watchability" score of the digital video with respect to certain distribution parameters.

Indeed, the digital content design system 102 can provide a distribution channel menu 706. Thus, the digital content design system 102 can enable a publisher to select a distribution channel through which to disseminate the digital video 600. Although not illustrated in FIG. 7, the digital content design system 102 can also provide options or elements for inputting other distribution parameters such as a time of day for distribution of the digital video 600 and/or characteristics of a target audience.

Based on the selected distribution parameters and the digital video 600, and in response to receiving a selection of the calculate element 708, the digital content design system 102 performs one or more of the techniques or methods described herein to generate the performance metric 702 for the digital video 600. As shown within the performance metric display 700, the digital content design system 102 can generate the performance metric 702 on a scale from 1 to 5, where 5 indicates a high performance (e.g., a high likelihood of success as part of a digital content campaign or a high level of "watchability"). The digital content design system 102 can generate a performance metric 702 that reflects a score that corresponds with the highest degree of confidence (e.g., probability) from among the possible scores. As shown, the digital content design system 102 generates a performance metric 702 of 2 with a confidence of 62 (e.g., 62%). Indeed, the digital content design system 102 can generate a distribution of scores 1 through 5, with each score having a corresponding confidence score (e.g., where the sum of all confidence scores is 100).

As illustrated in FIG. 7, because the duration of the digital video 600 is 104 seconds, the digital video 600 may not be well-suited for distribution with regard to a particular distribution parameter. For instance, the digital video 600 may be too long for effective distribution via a social network (such as INSTAGRAM). Indeed, utilizing a performance neural network, the digital content design system 102 generates a relatively low performance metric 702 for the digital video based on this distribution parameter.

Figure 8:
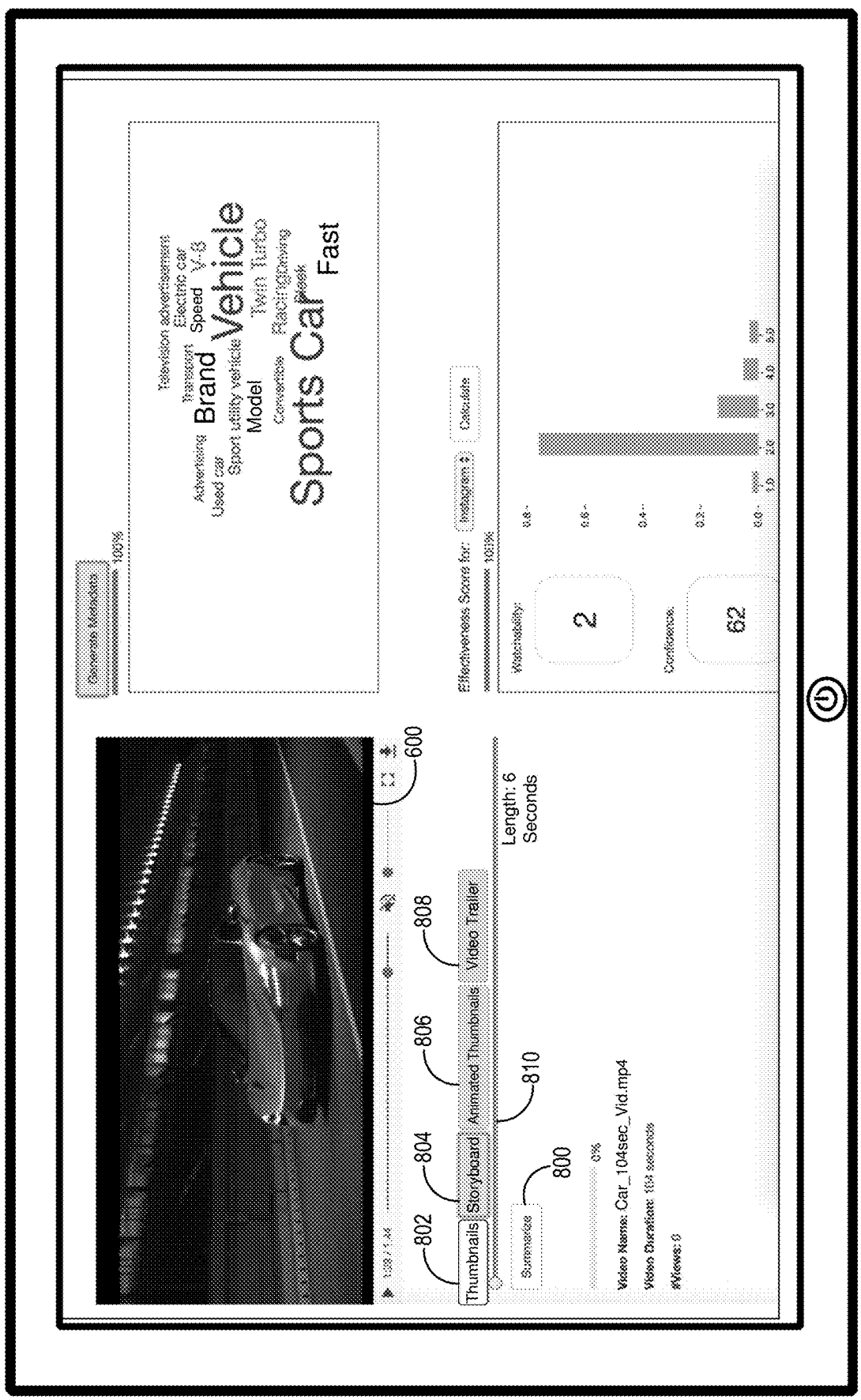
FIG. 8 illustrates an example user interface for generating a performance metric for a digital video in accordance with one or more embodiments.

As mentioned above, the digital content design system 102 can also generate digital video summaries to improve performance metrics. FIG. 8 illustrates a user interface for generating a digital video summary of the digital video 600. Indeed, the digital content design system 102 provides a user interface that includes a summarize element 800 and that further includes selectable options 802-808 corresponding to different formats of digital video summaries.

To illustrate, the digital content design system 102 provides an option 802 to select a thumbnail summary. Based on receiving a selection of the thumbnail summary option 802, and further based on receiving a user interaction with the summarize element 800, the digital content design system 102 generates a thumbnail digital summary for the digital video 600 in accordance with the disclosure herein. Similarly, the digital content design system 102 can generate a storyboard, an animated thumbnail, or a video trailer based on selections of options 804, 806, or 808, respectively.

The digital content design system 102 can further provide, within the user interface, a duration option 810. Indeed, the digital content design system 102 can enable a publisher to select or set a duration of a digital video summary by, for example, clicking and tracking (or touching and dragging) a slider element along a slider bar. In some embodiments, the digital content design system 102 can provide a duration option 810 that indicates a number of frames or a duration of time. For example, if a publisher selects storyboard option 804, the digital content design system 102 can provide a duration option 810 that enables the publisher to set the number of frames to be included within the storyboard. Similarly, if a publisher selects the video trailer option 808, the digital content design system 102 can provide a duration option 810 for the publisher to set a temporal duration of the video trailer to be generated. Thus, the digital content design system 102 can enable a publisher to modify a duration of a digital video summary. As shown in FIG. 8, the digital content design system 102 generates an animated thumbnail with a length of 6 seconds as a summary of the digital video 600.

Although not illustrated in FIG. 8, in some embodiments, rather than relying on user input to generate a digital video summary, the digital content design system 102 can generate a digital video summary automatically. In particular, the digital content design system 102 can determine a digital video summary that would result in an improved (e.g., the highest possible) performance metric as compared to the original digital video 600. In some embodiments, based on factors such as selected distribution parameters (e.g., the chosen distribution channel of YOUTUBE), the digital content design system 102 can generate (or suggest) an animated thumbnail. Based on a different distribution parameter, the digital content design system 102 can generate (or suggest) a video trailer.

Additionally, the digital content design system 102 can determine a duration of the digital video summary that will improve the performance metric. For instance, based on the selected distribution channel, the digital content design system 102 can determine that videos between 5 and 10 seconds will have a higher performance metric. Thus, the digital content design system 102 can generate and provide recommendations to modify a duration of the digital video summary. Moreover, in some embodiments, the digital content design system 102 can automatically modify the duration to improve the performance metric.

Figure 9:
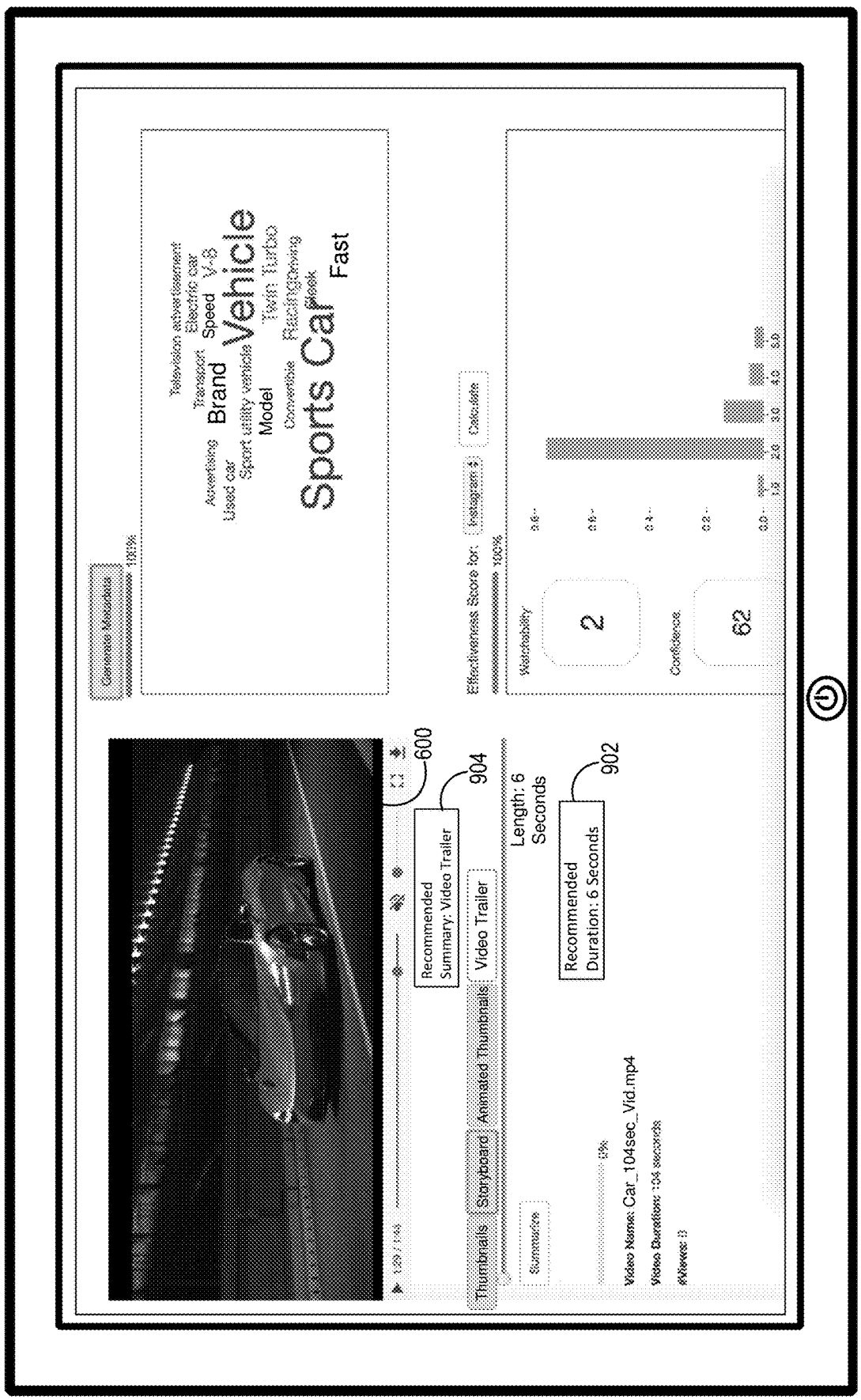
FIG. 9 illustrates an example user interface for generating a digital video summary of a digital video in accordance with one or more embodiments.

As mentioned, the digital content design system 102 can generate recommendations to modify various aspects of digital content to improve a performance metric. FIG. 9 illustrates a graphical user interface that includes recommendations 902 and 904. In particular, the digital content design system 102 can generate recommended modifications for the duration of the digital video summary, the type of digital video summary, and the distribution parameters such as the distribution channel. As shown in FIG. 9, the digital content design system 102 generates and provides a recommendation 902 to modify a duration of a digital video summary. The digital content design system 102 also generates a recommendation 904 to modify the type of digital video summary. As illustrated, the digital content design system 102 recommends a video trailer that is 6 seconds in duration.

In addition, the digital content design system 102 may determine that alternative distribution channels (e.g., FACEBOOK or YOUTUBE) are more appropriate for the digital video 600. Specifically, the digital content design system 102 can apply the performance neural network and determine that modifying the distribution channel will increase the performance metric (e.g., the "watchability" score) for the digital video. In response, the digital content design system 102 may provide a recommendation to the publisher device to change the distribution channel. In some embodiments, the digital content design system 102 may automatically change various aspects such as the duration, the type of digital video summary, and/or the distribution channel to improve the performance metric.

As mentioned, the digital content design system 102 can also generate and provide recommended modifications for other aspects of digital content. To illustrate, the digital content design system 102 can provide a recommendation to change a color palette, audio characteristics, or other characteristics of a digital video. To generate the recommended modifications (or to automatically select and apply a particular modification), the digital content design system 102 can utilize the various above-described neural networks to generate performance metrics based on variations in color palette, audio characteristics, etc. Thus, the digital content design system 102 can select a color palette, audio characteristics (in addition or alternatively to a particular duration, a particular digital video summary type, a particular distribution channel, etc.) that results in an improved (e.g., highest) performance metric.

Figure 10:
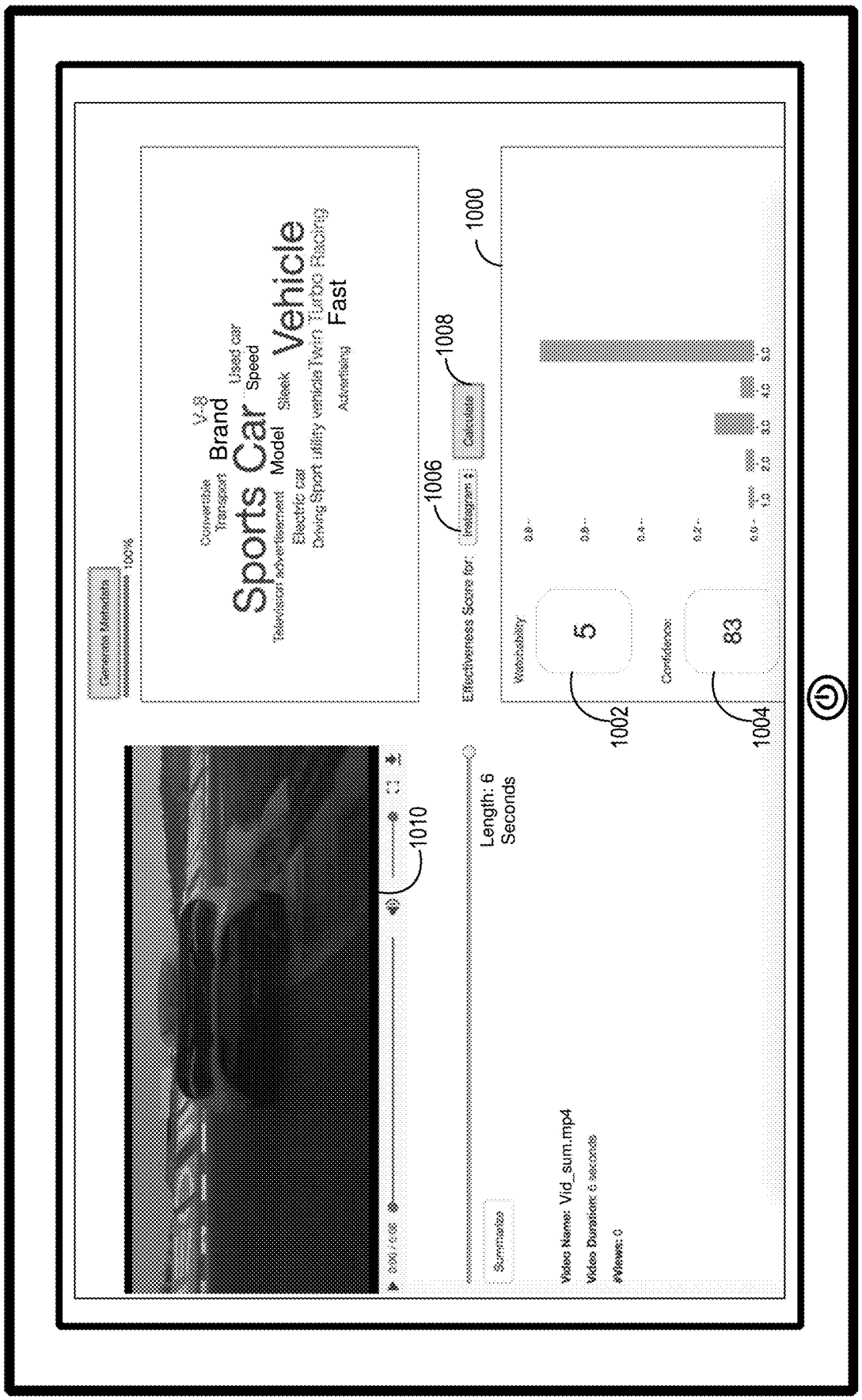
FIG. 10 illustrates an example user interface for generating an improved performance metric for a digital video summary in accordance with one or more embodiments.

As mentioned, the digital content design system 102 can determine improved performance metrics for a digital video summary. Indeed, FIG. 10 illustrates a user interface that includes a digital video summary 1010 that has a duration of 6 seconds. Based on the shorter duration, the digital content design system 102 can perform one or more of the techniques or methods described herein to determine an improved performance metric 1002. Indeed, at least partly because the digital video summary 1010 has a shorter duration, the digital content design system 102 generates an improved performance metric 1002 of 5 with a confidence score 1004 of 83.

The digital content design system 102 can generate the improved performance metric 1002 in response to receiving a selection of the calculate element 1008. In some embodiments, the digital content design system 102 generates the improved performance metric 1002 automatically (e.g., upon generating a modified digital video and without a user selection).

To generate the improved performance metric 1002, the digital content design system 102 can utilize a metadata neural network, a summarizer neural network, and a performance neural network, as described above. For example, the digital content design system 102 can utilize the summarizer neural network to generate a 6-second video trailer 1010. The digital content design system 102 can utilize a metadata neural network to generate metadata associated with the video trailer 1010. In some embodiments, however, the digital content design system 102 utilizes the metadata already generated for the original digital video 600. In addition, the digital content design system 102 utilizes the performance neural network to generate a performance metric for the video trailer 1010.

Additionally, the digital content design system 102 can provide for display the determined performance metrics and corresponding confidence scores within the performance metric display 1000. As illustrated, the digital content design system 102 generates an improved performance metric 1002 that is significantly higher than the performance metric 802 that corresponds to the original digital video 600.

In generating the improved performance metric 1002, in addition to the other above-described functions, the digital content design system 102 can be utilized to plan a digital content campaign. For example, the digital content design system 102 can provide, with respect to some given digital content, recommended changes to (or can automatically modify) digital video summaries, distribution parameters, color palettes, audio ranges, etc. Thus, the digital content design system 102 can determine how to format and distribute digital content in a way that will be most effective in generating conversions, impressions, or other campaign metrics.

Figure 11:
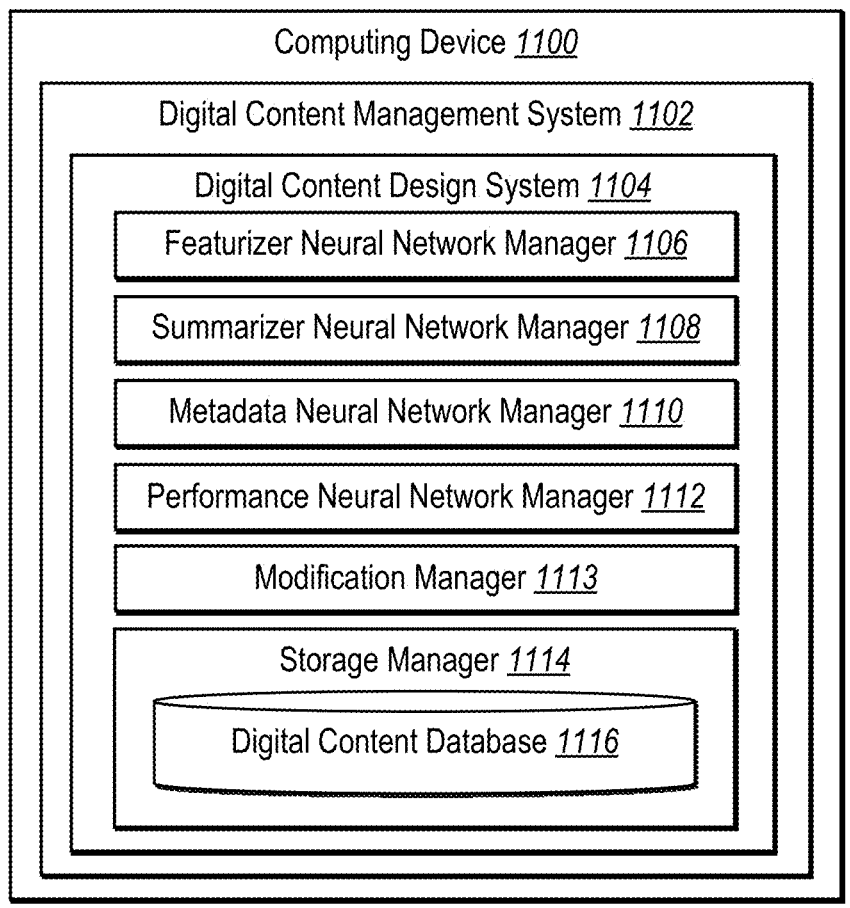
FIG. 11 illustrates a schematic diagram of a digital content design system in accordance with one or more embodiments.

Looking now to FIG. 11, additional detail will be provided regarding components and capabilities of a digital content design system 1104 (e.g., an exemplary embodiment of the digital content design system 102). Specifically, FIG. 11 illustrates an example schematic diagram of the digital content design system 1104 on an example computing device 1100 (e.g., one or more of the publisher device 108, the client device 112, and/or the server(s) 104). As shown in FIG. 11, the digital content design system 1104 may include a featurizer neural network manager 1106, a summarizer neural network manager 1108, a metadata neural network manager 1110, a performance neural network manager 1112, a modification manager 1113, and a storage manager 1114.

As mentioned, the digital content design system 1104 can include a featurizer neural network manager 1106. In particular, the featurizer neural network manager 1106 can generate, train, utilize, apply, manage, maintain, store, facilitate, and/or operate a featurizer neural network. For example, the featurizer neural network manager 1106 can perform the functions and techniques described above to analyze digital content and extract features (e.g., deep features) from a digital content item. The featurizer neural network manager 1106 can further communicate with the summarizer neural network manager 1108, the metadata neural network manager 1110, the performance neural network manager 1112, and the storage manager 1114 to transmit information such as extracted features associated with digital content.

The summarizer neural network manager 1108 can generate, train, utilize, apply, manage, maintain, store, facilitate, and/or operate a summarizer neural network. For example, the summarizer neural network manager 1108 can perform the functions and techniques described above to generate digital content summaries. Particularly, the summarizer neural network manager 1108 can utilize extracted features from the featurizer neural network manager 1106 to generate scores (e.g., aesthetics scores, relevancy scores, and selection scores) for individual frames of a digital video. The summarizer neural network manager 1108 can further select a subset of frames of the digital video to use as a digital video summary in accordance with the above description.

As shown, the digital content design system 1104 includes a metadata neural network manager 1110. The metadata neural network manager 1110 can generate, train, utilize, apply, manage, maintain, store, facilitate, and/or operate a metadata neural network. In particular, the metadata neural network manager 1110 can perform the functions and techniques described above to generate metadata for a digital content item. For instance, the metadata neural network manager 1110 can extract features of a digital video, utilize learnable pooling layers in relation to each class of extracted features to generate feature vectors, and generate keywords related to the content of the digital video based using a fully connected layer in relation to the generated feature vectors.

The digital content design system 1104 further includes a performance neural network manager 1112. In particular, the performance neural network manager 1112 can generate, train, utilize, apply, manage, maintain, store, facilitate, and/ or operate a performance neural network. For instance, the performance neural network manager 1112 can perform the functions and techniques described above to generate a performance metric for a digital content item. Indeed, the performance neural network manager 1112 can utilize a visual prediction neural network to generate a visual performance metric, and the performance neural network manager 1112 can also utilize a text prediction neural network to generate a textual performance metric. Additionally, the performance neural network manager 1112 can utilize a multi-modal combination model to generate a composite performance metric based on the visual performance metric and the textual performance metric.

As shown, the digital content design system 1104 also includes a storage manager 1114. The storage manager 1114 can communicate with one or more other components of the digital content design system 1104 to store and/or provide digital content. For example, the storage manager 1114 can store, manage, or maintain digital videos, digital audio, digital images, or other forms of digital content within the digital content database 1116. Additionally, the storage manager 1114 can store metadata associated with digital content including metadata generated by the metadata neural network manager 1110. The storage manager 1114 can also store performance metrics, extracted features, and digital content summaries associated with digital content and as generated by the various components of the digital content design system 1104.

In addition, the digital content design system 1104 can include a modification manager 1113. For example, the modification manager 1113 can generate recommended modifications for various aspects of digital content including a type of digital video summary, a duration, distribution parameters, color palette, etc. In addition (or alternatively), the modification manager 1113 can modify the various aspects of digital content (with or without user input). Indeed, the modification manager 1113 can perform the various methods and techniques described herein to, for example, change a number of frames to modify a duration of a digital video summary.

As illustrated, the digital content design system 1104 and its components can be included in a digital content management system 1102 (e.g., the digital content management system 106). In particular, the digital content management system 1102 can include a digital content editing system, a digital content campaign system, or a digital media distribution system.

In one or more embodiments, each of the components of the digital content design system 1104 are in communication with one another using any suitable communication technologies. Additionally, the components of the digital content design system 1104 can be in communication with one or more other devices including one or more user client devices described above. It will be recognized that although the components of the digital content design system 1104 are shown to be separate in FIG. 11, any of the subcomponents may be combined into fewer components, such as into a single component, or divided into more components as may serve a particular implementation. Furthermore, although the components of FIG. 11 are described in connection with the digital content design system 1104, at least some of the components for performing operations in conjunction with the digital content design system 1104 described herein may be implemented on other devices within the environment.

The components of the digital content design system 1104 can include software, hardware, or both. For example, the components of the digital content design system 1104 can include one or more instructions stored on a computer-readable storage medium and executable by processors of one or more computing devices (e.g., the computing device 1100). When executed by the one or more processors, the computer-executable instructions of the digital content design system 1104 can cause the computing device 1100 to perform the methods described herein. Alternatively, the components of the digital content design system 1104 can comprise hardware, such as a special purpose processing device to perform a certain function or group of functions. Additionally or alternatively, the components of the digital content design system 1104 can include a combination of computer-executable instructions and hardware.

Furthermore, the components of the digital content design system 1104 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital content design system 1104 may be implemented as part of a stand-alone application on a personal computing device or a mobile device. Alternatively or additionally, the components of the digital content design system 1104 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-11, the corresponding text, and the examples provide a number of different systems, methods, and non-transitory computer readable media for generating and providing digital video summaries. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
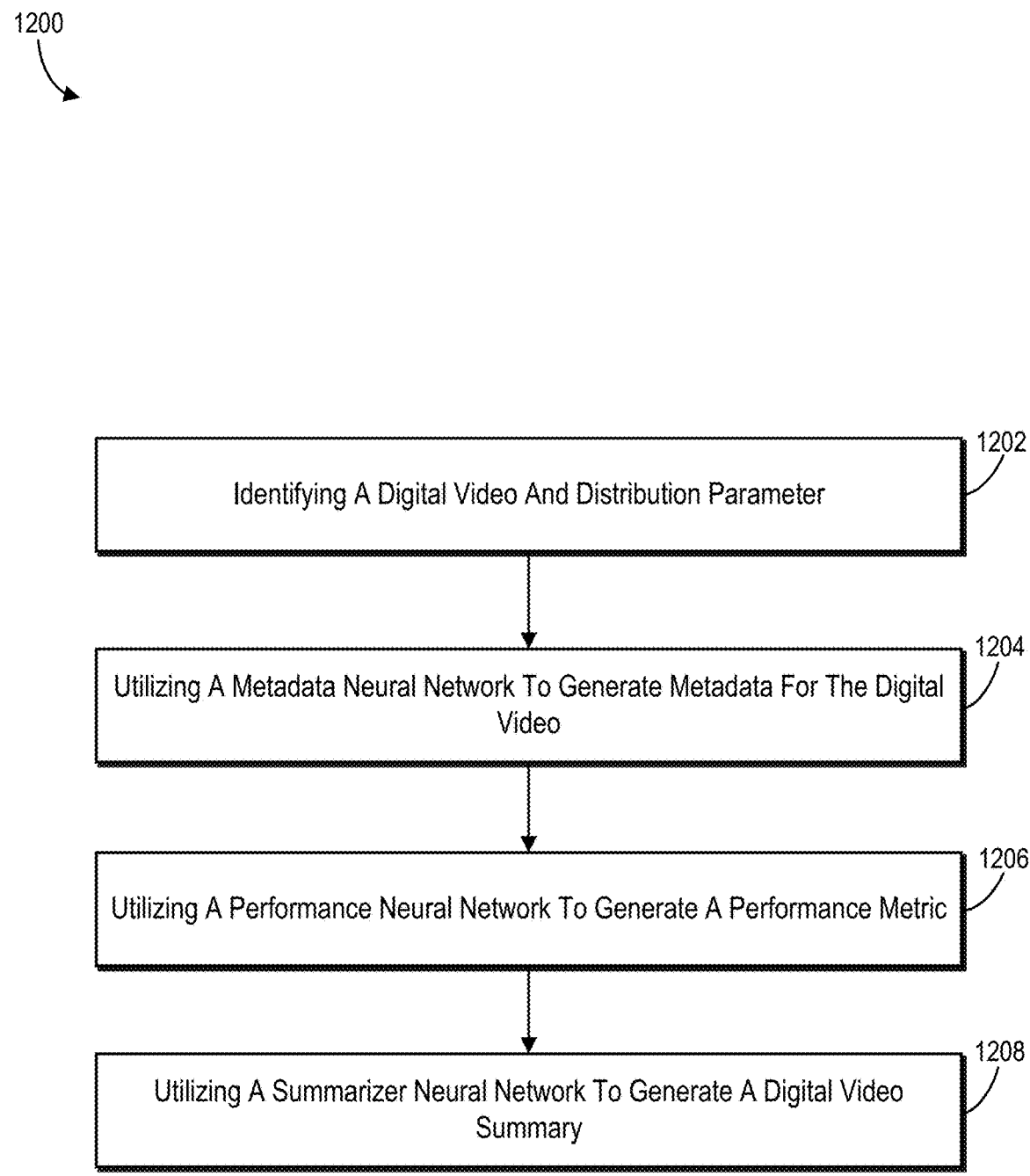
FIG. 12 illustrates a flowchart of a series of acts for generating digital video summaries in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 of generating a digital video summary to improve a performance metric. The series of acts 1200 includes an act 1202 of identifying a digital video and a distribution parameter. In particular, the act 1202 can include identifying a digital video and a distribution parameter for providing digital content to one or more client devices.

As shown, the series of acts 1200 further includes an act 1204 of utilizing a metadata neural network to generate metadata for the digital video. In particular, the act 1204 can include utilizing a metadata neural network to generate metadata for the digital video, the metadata comprising keywords reflecting content of the digital video. For example, the act 1204 can involve extracting visual features and audio features associated with the digital video, utilizing a first learnable pooling layer to analyze the visual features to generate a visual feature vector and a second learnable pooling layer to analyze the audio features to generate an audio feature vector, and utilizing a fully connected layer to analyze the visual feature vector and the audio feature vector to generate the metadata.

The series of acts 1200 also includes an act 1206 of utilizing a performance neural network to generate a performance metric. In particular, the act 1206 can include utilizing a performance neural network to generate a performance metric based on the digital video, the generated metadata, and the distribution parameter. For example, the act 1206 can involve utilizing a visual prediction neural network to generate predicted visual performance metrics based on video data of the digital video summary, generating, by utilizing a text prediction neural network, textual performance metrics based on the generated metadata for the digital video, and applying a multi-modal combination model to generate a composite performance metric based on the visual performance metrics and the textual performance metrics.

As shown, the series of acts 1200 further includes an act 1208 of utilizing a summarizer neural network to generate digital video summary. In particular, the act 1208 can include, upon determining the performance metric, utilizing a summarizer neural network to generate a digital video summary having an improved performance metric for the distribution parameter relative to the performance metric of the digital video and having a shorter duration relative to the digital video. For example, the act 1208 can involve utilizing an aesthetics neural network to generate aesthetics scores for frames of the digital video, generating, by utilizing a relevancy neural network, relevancy scores for frames of the digital video, applying a generative reconstructor neural network to generate a reconstructed digital video based on the aesthetics scores and the relevancy scores, and generating the digital video summary based on comparing the digital video with the reconstructed digital video.

The series of acts 1200 can further include an act of determining that the performance metric fails to satisfy a threshold score. Additionally, the series of acts 1200 can include acts of, based on determining that the performance metric fails to satisfy the threshold score, utilizing the summarizer neural network to generate the digital video summary, utilizing the performance neural network to generate the improved performance metric for the digital video summary, and determining that the improved performance metric satisfies the threshold score.

In addition, the series of acts 1200 can include an act of, based on determining that the performance metric fails to satisfy the threshold score, generating recommended modifications for the digital video summary to improve the performance metric, wherein the recommended modifications comprise one or more of: a recommendation duration, a recommended distribution channel, a recommended time of day for distribution, or a recommended target audience. The distribution parameters can include one or more of: a distribution channel, a time of day for distribution, or characteristics of a target audience.

The series of acts 1200 can further include an act of extracting, by applying a featurizer neural network to frames of a digital video, deep features associated with the digital video. The featurizer neural network can include one or more of: a video neural network for extracting video features, an audio neural network for extracting audio features, or a metadata neural network for extracting metadata features. In addition, the series of acts 1200 can include an act of applying the summarizer neural network to the extracted deep features to generate a digital summary for the digital video. The series of acts 1200 can still further include acts of utilizing the metadata neural network to generate, based on the extracted deep features, metadata for the digital video, the metadata comprising keywords reflecting content of the digital video, upon identifying a distribution parameter for the digital video, utilizing the performance neural network to generate a performance metric based on the generated digital summary, the generated metadata, and the distribution parameter, generating one or more proposed modifications to the generated digital summary to improve the performance metric, and provide the proposed modifications and the improved performance metric for display to a publisher device.

Further, the series of acts 1200 can include an act of improving the performance metric by generating a recommended duration for the digital summary based on the identified distribution parameter. Improve the performance metric can include determining a modification to make to the distribution parameter. The series of acts 1200 can also include an act of modifying the digital summary based on the proposed modifications. Modifying the digital summary can involve automatically altering a duration of the digital summary to improve the performance metric. Modifying the digital summary can also involve receiving a user interaction to alter a duration of the digital summary to improve the performance metric. Modifying the digital summary can also involve receiving a user input to modify a duration of digital content.

Figure 13:
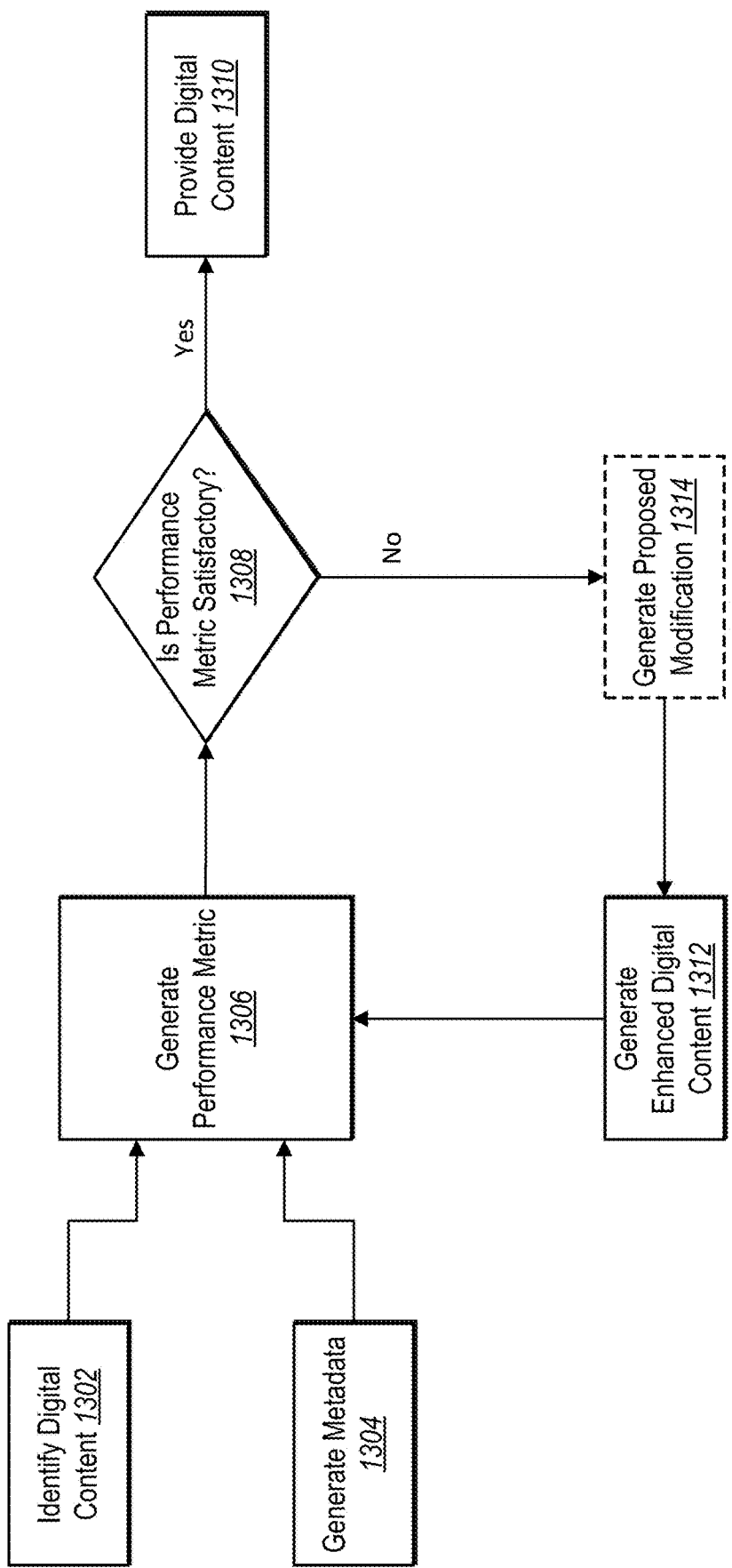
FIG. 13 illustrates a series of acts in a step for generating enhanced digital content corresponding to a distribution parameter from a digital video utilizing a summarizer neural network and a performance neural network.

As mentioned, the digital content design system 102 can generate enhanced digital content for a digital content campaign. Indeed, FIG. 13 illustrates exemplary acts in a step for generating enhanced digital content corresponding to the distribution parameter from the digital video utilizing a summarizer neural network and a performance neural network. As illustrated, the step for generating enhanced digital content corresponding to the distribution parameter from the digital video utilizing a summarizer neural network and a performance neural network can involve acts 1302-1314.

In particular, the digital content design system 102 can perform act 1302 to identify digital content. For instance, the digital content design system 102 can identify a digital video or a digital video summary. In some embodiments, the digital content design system 102 receives a digital video from a publisher device. The digital content design system 102 can also utilize a summarizer neural network to generate a digital video summary in accordance with the description herein.

As illustrated, the digital content design system 102 further performs act 1304 to generate metadata associated with digital content. For example, the digital content design system 102 utilizes a metadata neural network to generate metadata for a digital video or a digital video summary in accordance with the description herein. Indeed, the digital content design system 102 can generate keywords that are related to a digital video or a digital video summary.

As also illustrated, the digital content design system 102 performs act 1306 to generate a performance metric for a digital content item. For example, the digital content design system 102 utilizes a performance neural network in accordance with the description herein to generate a composite performance metric based on visual performance metrics and textual performance metrics.

In addition, the digital content design system 102 performs act 1308 to determine whether the performance metric is satisfactory. For example, the digital content design system 102 can determine whether the performance metric satisfies a threshold score. In some embodiments the threshold score can refer to the rating on the scale of 1 to 5 (or a different scale). In other embodiments, the threshold score can refer to the rating on the scale of 1 to 5 (or a different scale) as well as the confidence score. For example, the digital content design system 102 can determine that an acceptable score is one that meets or exceeds a threshold score (e.g., 3) and that has a corresponding confidence score that also meets or exceeds a threshold (e.g., 65, 80, 90, etc.).

In response to determining that the performance metric is not satisfactory, the digital content design system 102 further performs an act 1314 to generate a proposed modification to the digital content. For example, the digital content design system 102 can generate a modification for a digital video and/or for distribution parameters associated with the digital video in accordance with the description herein. In some embodiments, the digital content design system 102 does not perform act 1314 but instead performs act 1312 to generate enhanced digital content automatically.

Indeed, the digital content design system 102 can perform act 1312 to generate enhanced digital content in the form of a digital video summary or a modified digital video summary. For instance, the digital content design system 102 can generate a digital video summary with a particular duration to improve the performance metric with respect to a particular target audience and/or distribution channel. Thus, the digital content design system 102 can repeat acts 1306, 1308, 1314, and 1312 until the digital content design system 102 determines that the performance metric is satisfactory. As mentioned above, the digital content design system 102 can also modify the distribution parameters for digital content to improve a performance metric.

Additionally, or alternatively, the digital content design system 102 can perform act 1312 (and/or act 1314) without first determining that the performance metric satisfies a threshold. In particular, in some embodiments the digital content design system 102 can generate a proposed modification (or otherwise modify) digital content to improve a performance metric irrespective of a particular threshold. Additionally, the digital content design system 102 can receive user input to modify a digital video and/or a digital video summary to improve a performance metric even in circumstances where the performance metric already satisfies a threshold.

Based on determining that the performance metric is satisfactory, the digital content design system 102 can perform act 1310 to provide the digital content to a publisher device and/or client device. In some embodiments, the digital content design system 102 can provide a digital video summary to a publisher device upon determining that the performance metric is satisfactory. In the same or other embodiments, the digital content design system 102 can provide the digital video summary to one or more client devices via a distribution channel as part of a digital content campaign.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
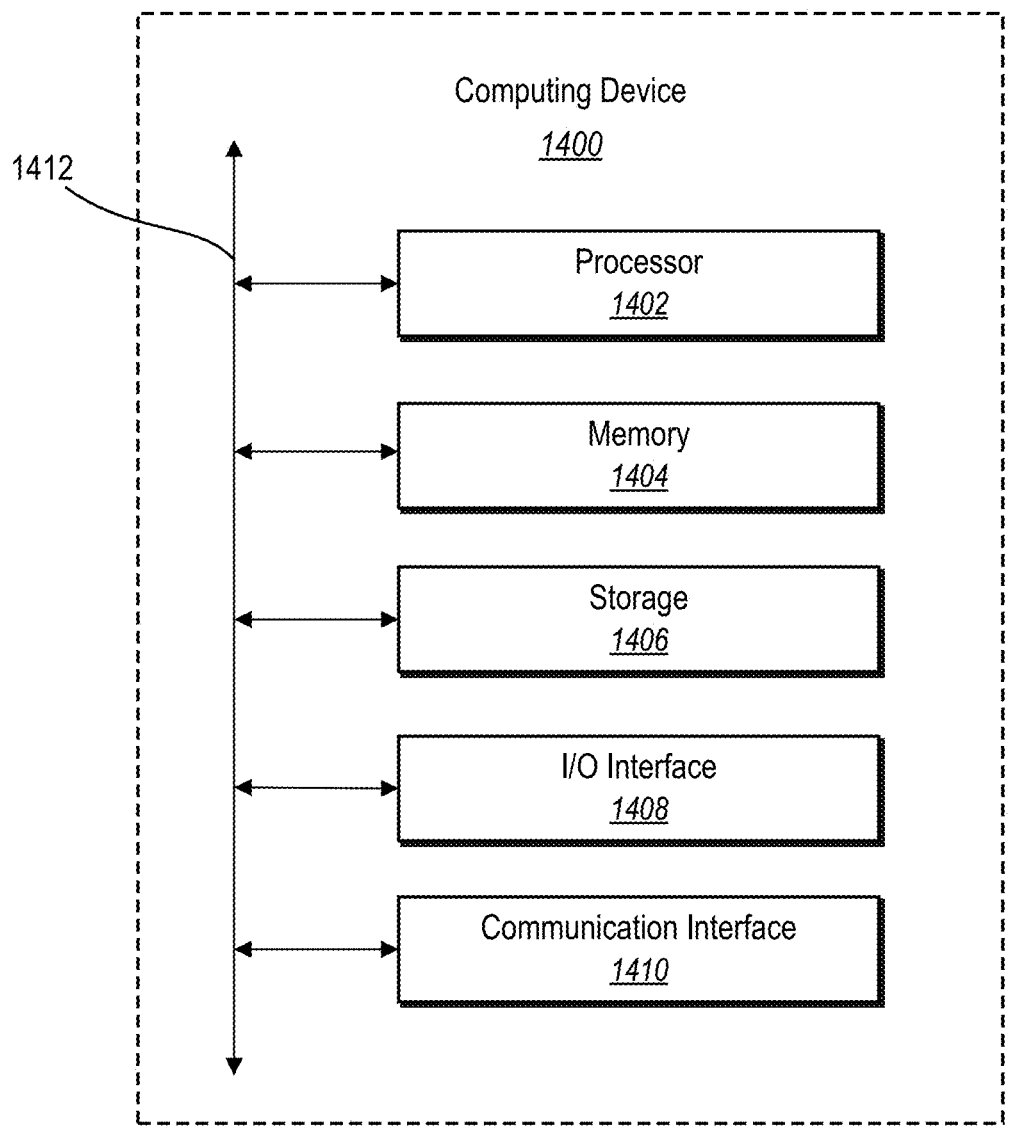
FIG. 14 illustrates a block diagram of an example computing device in accordance with one or more embodiments.

FIG. 14 illustrates, in block diagram form, an example computing device 1400 (e.g., computing device 1100, publisher device 108, client device 112, and/or server(s) 104) that may be configured to perform one or more of the processes described above. One will appreciate that the digital content design system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for planning a digital content campaign, a computer-implemented method for generating enhanced content to improve performance of the digital content campaign, the computer-implemented method comprising:
   identifying a digital video and a distribution parameter for providing digital content to one or more client devices;
   utilizing a metadata neural network to generate metadata for the digital video, the metadata comprising keywords reflecting content of the digital video;
   utilizing a performance neural network to generate, based on the generated metadata and the distribution parameter, a performance metric reflecting a predicted measure of audience reaction upon distribution of the digital video; and
   upon determining the performance metric, utilizing a summarizer neural network to generate a digital video summary having an improved performance metric for the distribution parameter relative to the performance metric of the digital video and having a shorter duration relative to the digital video.

2. The method of claim 1, wherein the distribution parameter comprises at least one of: a distribution channel, a time of day for distribution, or characteristics of a target audience.

3. The method of claim 1, wherein utilizing the metadata neural network to generate metadata for the digital video comprises:
   extracting visual features and audio features associated with the digital video;
   utilizing a first learnable pooling layer to analyze the visual features to generate a visual feature vector and a second learnable pooling layer to analyze the audio features to generate an audio feature vector; and
   utilizing a fully connected layer to analyze the visual feature vector and the audio feature vector to generate the metadata.

4. A non-transitory computer readable medium comprising instructions that, when executed by at least one processor, cause a computer device to:
   identify a digital video and a distribution parameter for providing digital content to one or more client devices;
   utilize a metadata neural network to generate metadata for the digital video, the metadata comprising keywords reflecting content of the digital video;
   utilize a performance neural network to generate, based on the generated metadata and the distribution parameter, a performance metric reflecting a predicted measure of audience reaction upon distribution of the digital video; and
   upon determining the performance metric, utilize a summarizer neural network to generate a digital video summary having an improved performance metric for the distribution parameter relative to the performance metric of the digital video and having a shorter duration relative to the digital video.

5. The method of claim 3, wherein utilizing the summarizer neural network to generate the digital video summary comprises:
- utilizing an aesthetics neural network to generate aesthetics scores for frames of the digital video;
- generating, by utilizing a relevancy neural network, relevancy scores for the frames of the digital video;
- applying a generative reconstructor neural network to generate a reconstructed digital video based on the aesthetics scores and the relevancy scores; and
- generating the digital video summary based on comparing the digital video with the reconstructed digital video.

6. The non-transitory computer readable medium of claim 4, further comprising instructions that, when executed by the at least one processor, cause the computer device to generate recommended modifications for the digital video summary to improve the performance metric, wherein the recommended modifications comprise one or more of: a recommendation duration, a recommended distribution channel, a recommended time of day for distribution, or a recommended target audience.

7. The non-transitory computer readable medium of claim 6, further comprising instructions that, when executed by the at least one processor, cause the computer device to utilize the metadata neural network to generate metadata for the digital video by:
- extracting visual features and audio features associated with the digital video;
- utilizing a first learnable pooling layer to analyze the visual features to generate a visual feature vector and a second learnable pooling layer to analyze the audio features to generate an audio feature vector; and
- utilizing a fully connected layer to analyze the visual feature vector and the audio feature vector to generate the metadata.

8. The non-transitory computer readable medium of claim 6, further comprising instructions that, when executed by the at least one processor, cause the computer device to utilize the summarizer neural network to generate the digital video summary by:
- utilizing an aesthetics neural network to generate aesthetics scores for frames of the digital video;
- generating, by utilizing a relevancy neural network, relevancy scores for frames of the digital video;
- applying a generative reconstructor neural network to generate a reconstructed digital video based on the aesthetics scores and the relevancy scores; and
- generating the digital video summary based on comparing the digital video with the reconstructed digital video.

9. The non-transitory computer readable medium of claim 6, further comprising instructions that, when executed by the at least one processor, cause the computer device to utilize the performance neural network to generate the performance metric by:
- utilizing a visual prediction neural network to generate predicted visual performance metrics based on video data of the digital video summary;
- generating, by utilizing a text prediction neural network, textual performance metrics based on the generated metadata for the digital video; and
- applying a multi-modal combination model to generate a composite performance metric based on the visual performance metrics and the textual performance metrics.

10. The non-transitory computer readable medium of claim 6, further comprising instructions that, when executed by the at least one processor, cause the computer device to determine that the performance metric fails to satisfy a threshold score.

11. The non-transitory computer readable medium of claim 6, wherein the distribution parameter comprises one or more of: a distribution channel, a time of day for distribution, or characteristics of a target audience.

12. The non-transitory computer readable medium of claim 10, further comprising instructions that, when executed by the at least one processor, cause the computer device to:
- based on determining that the performance metric fails to satisfy the threshold score, utilize the summarizer neural network to generate the digital video summary; and
- utilize the performance neural network to generate the improved performance metric for the digital video summary.

13. A system comprising:
at least one processor; and
a non-transitory computer readable medium comprising: a summarizer neural network, a metadata neural network, a performance neural network, and instructions that, when executed by the at least one processor, cause the system to:
- extract, by applying a featurizer neural network to frames of a digital video, deep features associated with the digital video;
- apply the summarizer neural network to the extracted deep features to generate a digital summary for the digital video;
- utilize the metadata neural network to generate, based on the extracted deep features, metadata for the digital video, the metadata comprising keywords reflecting content of the digital video;
- upon identifying a distribution parameter for the digital video, utilize the performance neural network to generate, based on the generated digital summary, the generated metadata, and the distribution parameter, a performance metric reflecting a predicted measure of audience reaction upon distribution of the digital video;
- generate one or more proposed modifications to the generated digital summary to improve the performance metric; and
- provide the proposed modifications for display to a publisher device.

14. The system of claim 13, further comprising instructions that, when executed by the at least one processor, cause the system to generate the one or more proposed modifications to improve the performance metric by generating a recommended duration for the digital summary based on the identified distribution parameter.

15. The system of claim 13, wherein the distribution parameter comprises one or more of: a distribution channel, a time of day for distribution, or characteristics of a target audience.

16. The system of claim 13, further comprising instructions that, when executed by the at least one processor, cause the system to modify the digital summary based on the proposed modifications.

17. The system of claim 13, wherein the featurizer neural network comprises one or more of: a neural network for extracting video features or a neural network for extracting audio features.

18. The system of claim 13, further comprising instructions that, when executed by the at least one processor, cause the system to generate the one or more proposed modifications to improve the performance metric by determining a modification to the distribution parameter.

19. The system of claim 16, further comprising instructions that, when executed by the at least one processor, cause the system to modify the digital summary by altering a duration of the digital summary to improve the performance metric.

20. The system of claim 16, further comprising instructions that, when executed by the at least one processor, cause the system to modify the digital summary by receiving a user interaction to alter a duration of the digital summary to improve the performance metric.

* * * * *